US012802531B2

(12) United States Patent
Namura et al.

(10) Patent No.: US 12,802,531 B2
(45) Date of Patent: Nov. 17, 2026

(54) MEDIUM HANDLING APPARATUS, MEDIUM HANDLING SYSTEM, MEDIUM HANDLING METHOD, AND NON-TRANSITORY RECORDING MEDIUM

(71) Applicant: GLORY LTD., Hyogo (JP)

(72) Inventors: Shigeo Namura, Hyogo (JP); Yoshihiro Kasuya, Hyogo (JP)

(73) Assignee: GLORY LTD, Hyogo (JP)

( * ) Notice: Subject to any disclaimer, the term of this patent is extended or adjusted under 35 U.S.C. 154(b) by 170 days.

(21) Appl. No.: 18/619,276

(22) Filed: Mar. 28, 2024

(65) Prior Publication Data

US 2024/0331509 A1 Oct. 3, 2024

(30) Foreign Application Priority Data

Mar. 30, 2023 (JP) ................................ 2023-055721

(51) Int. Cl.
*G07F 19/00* (2006.01)

(52) U.S. Cl.
CPC .................................. *G07F 19/201* (2013.01)

(58) Field of Classification Search
CPC ..................................................... G07F 19/201
USPC .......................................................... 235/379
See application file for complete search history.

(56) References Cited

U.S. PATENT DOCUMENTS

| | | | | |
|---|---|---|---|---|
| 6,568,595 | B1 * | 5/2003 | Russell | G06Q 30/0603 235/375 |
| 7,567,924 | B1 | 7/2009 | Drummond | |
| 2002/0032655 | A1 * | 3/2002 | Antonin | G07F 19/207 705/43 |
| 2002/0138431 | A1 * | 9/2002 | Antonin | G07F 19/207 705/42 |
| 2003/0208405 | A1 | 11/2003 | Putman | |
| 2004/0046014 | A1 * | 3/2004 | Russell | G06F 16/9554 235/375 |
| 2006/0036711 | A1 | 2/2006 | Obara | |
| 2022/0060592 | A1 | 2/2022 | Kondo | |

FOREIGN PATENT DOCUMENTS

| | | | |
|---|---|---|---|
| EP | 1066610 | B1 | 12/2015 |
| EP | 3007144 | A1 | 4/2016 |
| JP | 2014-057162 | A | 3/2014 |
| JP | 6291908 | B2 | 3/2018 |
| JP | 6806571 | B2 | 1/2021 |
| WO | 9840826 | A2 | 9/1998 |

OTHER PUBLICATIONS

Extended European Search Report dated Jul. 22, 2024.

* cited by examiner

*Primary Examiner* — Daniel A Hess
(74) *Attorney, Agent, or Firm* — Shih IP Law Group, PLLC.

(57) ABSTRACT

A medium handling apparatus of the present disclosure that performs a transaction of a valuable medium includes the following: a display; a communicator that receives, from a server device, transaction screen configuration data defining a configuration of a transaction screen to be displayed on the display; a storage that stores data of an image to be embedded in the transaction screen; and a controller that generates, based on the transaction screen configuration data and the data of the image, the transaction screen in which the image is embedded, and causes the display to display the transaction screen.

14 Claims, 18 Drawing Sheets

MEDIUM HANDLING APPARATUS, MEDIUM HANDLING SYSTEM, MEDIUM HANDLING METHOD, AND NON-TRANSITORY RECORDING MEDIUM

CROSS REFERENCE TO RELATED APPLICATIONS

This application is entitled to and claims the benefit of Japanese Patent Application No. 2023-055721, filed on Mar. 30, 2023, the disclosure of which including the specification, drawings and abstract is incorporated herein by reference in its entirety.

TECHNICAL FIELD

The present disclosure relates to a medium handling apparatus, a medium handling system, a medium handling method, and a non-transitory recording medium.

BACKGROUND ART

Financial institutions such as banks have widely used medium handling apparatuses that allow customers to conduct transactions related to valuable media by themselves without going to a counter. Such a medium handling apparatus displays various screens containing information related to transactions.

An example of a system comprising a medium handling apparatus is a system in which a HyperText Markup Language (HTML) document is transmitted from a server device to an automated teller machine (ATM) via a network in order to display information on the touch screen of the ATM.

SUMMARY

A medium handling apparatus according to the present disclosure is a medium handling apparatus that performs a transaction of a valuable medium, and the medium handling apparatus comprises: a display; a communicator that receives, from a server device, transaction screen configuration data defining a configuration of a transaction screen to be displayed on the display; a storage that stores data of an image to be embedded in the transaction screen; and a controller that generates, based on the transaction screen configuration data and the data of the image, the transaction screen in which the image is embedded, the controller causing the display to display the transaction screen.

DESCRIPTION OF EMBODIMENTS

Figure 1:
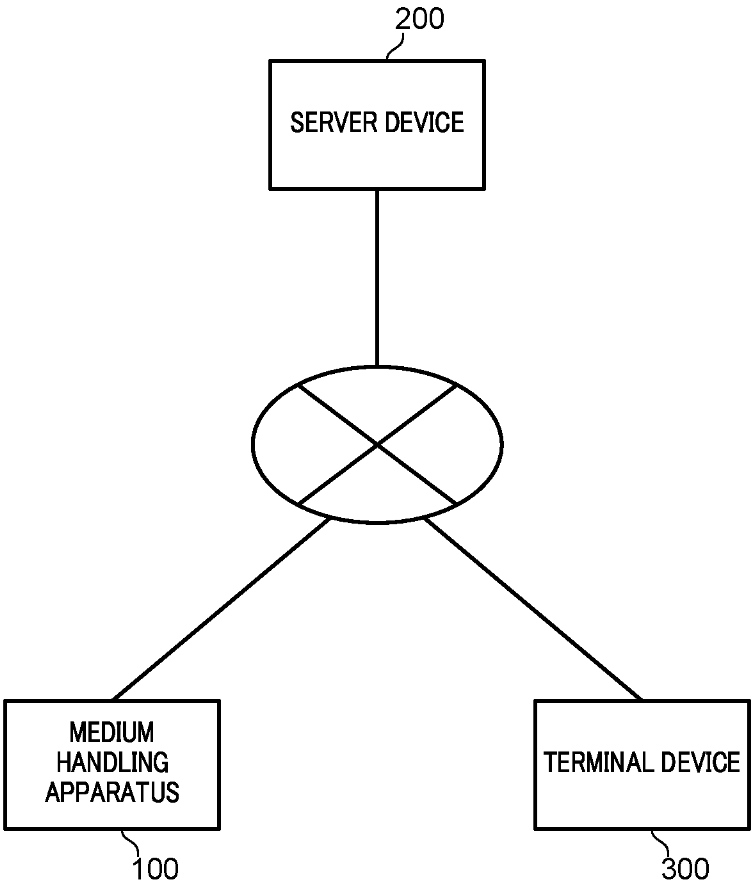
FIG. 1 illustrates an exemplary configuration of a medium handling system according to the present embodiment.

In a system comprising a medium handling apparatus, data for images to be displayed on the touch screen may also be transmitted from a server device. In such a case, when the medium handling apparatus is changed and an image is newly displayed on the screen of the new medium handling apparatus, it is necessary to rewrite the HTML document transmitted from the server device, resulting in poor efficiency for system development.

An object of the present disclosure is to provide a medium handling apparatus, medium handling system, medium handling method, and medium handling program that allow efficient system development even when the medium handling apparatus is changed.

The display may comprise a plurality of displays; and when the control unit receives, from the server device, operation screen configuration data that defines a configuration of an operation screen and that comprises an instruction to display the operation screen on one display of the plurality of displays, the control unit may display the operation screen on the one display according to the instruction.

In addition, the operation screen configuration data may be data that defines the configuration of the operation screen allowing an operation that varies depending on a display, namely one of the plurality of displays, on which the operation screen is displayed.

In addition, the operation screen configuration data may be data that defines the configuration of the operation screen allowing an operation that varies depending on an operator.

In addition, the storage unit may further store error cancellation screen configuration data and data of an error cancellation image, where the error cancellation screen configuration data defines a configuration of an error cancellation screen that prompts for error cancellation when an error occurs; and when the error occurs, the control unit may generate the error cancellation screen based on the error cancellation screen configuration data and the data of the error cancellation image, and causes the error cancellation screen to be displayed in a foreground so as to be superposed on another displayed screen.

The image to be embedded in the transaction screen may have a size identical with a size of a display area of the image defined in the transaction screen configuration data.

In addition, the image to be embedded in the transaction screen may comprise a plurality of images that are sequentially embedded in the transaction screen according to progress of the transaction; and the control unit may generate the transaction screen in which each of the plurality of images is embedded according to the progress of the transaction, and cause the display to display the transaction screen.

In addition, the communication unit may further receive a request to execute the transaction from the server device, and the control unit may execute the transaction according to the request received from the server device.

In addition, the image to be embedded in the transaction screen may be a guiding image that guides an operator.

In addition, the transaction screen configuration data may be written in HTML.

In addition, the image may be embedded in the transaction screen by using an iframe tag.

In addition, a medium handling system according to the present disclosure may comprise the medium handling apparatus and a server device transmitting the transaction screen configuration data to the medium handling apparatus.

A medium handling method according to the present disclosure is a medium handling method that performs a transaction of a valuable medium, and the method comprises: receiving, from a server device, transaction screen configuration data defining a configuration of a transaction screen to be displayed on a display; and generating, based on the transaction screen configuration data and data of an image to be embedded in the transaction screen, the transaction screen in which the image is embedded, and causing the display to display the transaction screen, where the data of the image is stored in a storage unit of a medium handling apparatus.

In addition, a non-transitory recording medium to the present disclosure is a medium recording thereon a medium handling program that performs a transaction of a valuable medium, the medium handling program causing a computer to execute: receiving, from a server device, transaction screen configuration data defining a configuration of a transaction screen to be displayed on a display; and generating, based on the transaction screen configuration data and data of an image to be embedded in the transaction screen, the transaction screen in which the image is embedded, and causing the display to display the transaction screen, where the data of the image is stored in a storage unit of a medium handling apparatus.

The medium handling apparatus, medium handling system, medium handling method, and medium handling program according to the present disclosure allow efficient system development even when the medium handling apparatus is changed.

FIG. 1 illustrates an exemplary configuration of a medium handling system according to the present embodiment. The medium handling system comprises a medium handling apparatus 100, a server device 200, and a terminal device 300, which are communicably connected to each other via a network.

The medium handling apparatus 100 is installed in various facilities, for example, stores of financial institutions such as banks (financial stores), stores such as convenience stores (distribution stores), and the like. The medium handling apparatus 100 is an apparatus that performs various processing related to transactions targeting various valuable media.

Specific examples of the valuable media comprise banknotes, coins, and checks. The coins comprise rolled coins and loose coins. The banknotes may comprise bound notes and loose notes. Specific examples of the transactions comprise depositing, dispensing, currency exchange, and transfers.

The server device 200 is a server device that controls the medium handling apparatus 100 to execute predetermined processing. For example, the server device 200 communicates with the medium handling apparatus 100 using Hypertext Transfer Protocol Secure (HTTPS). For example, the server device 200 may be a server device that provides a shared service.

The terminal device 300 is a terminal device such as a smartphone or a tablet terminal used by a user performing a transaction of a valuable medium to access a transaction site provided by the server device 200. For example, the user logs into the transaction site by using the terminal device 300.

Figure 2:
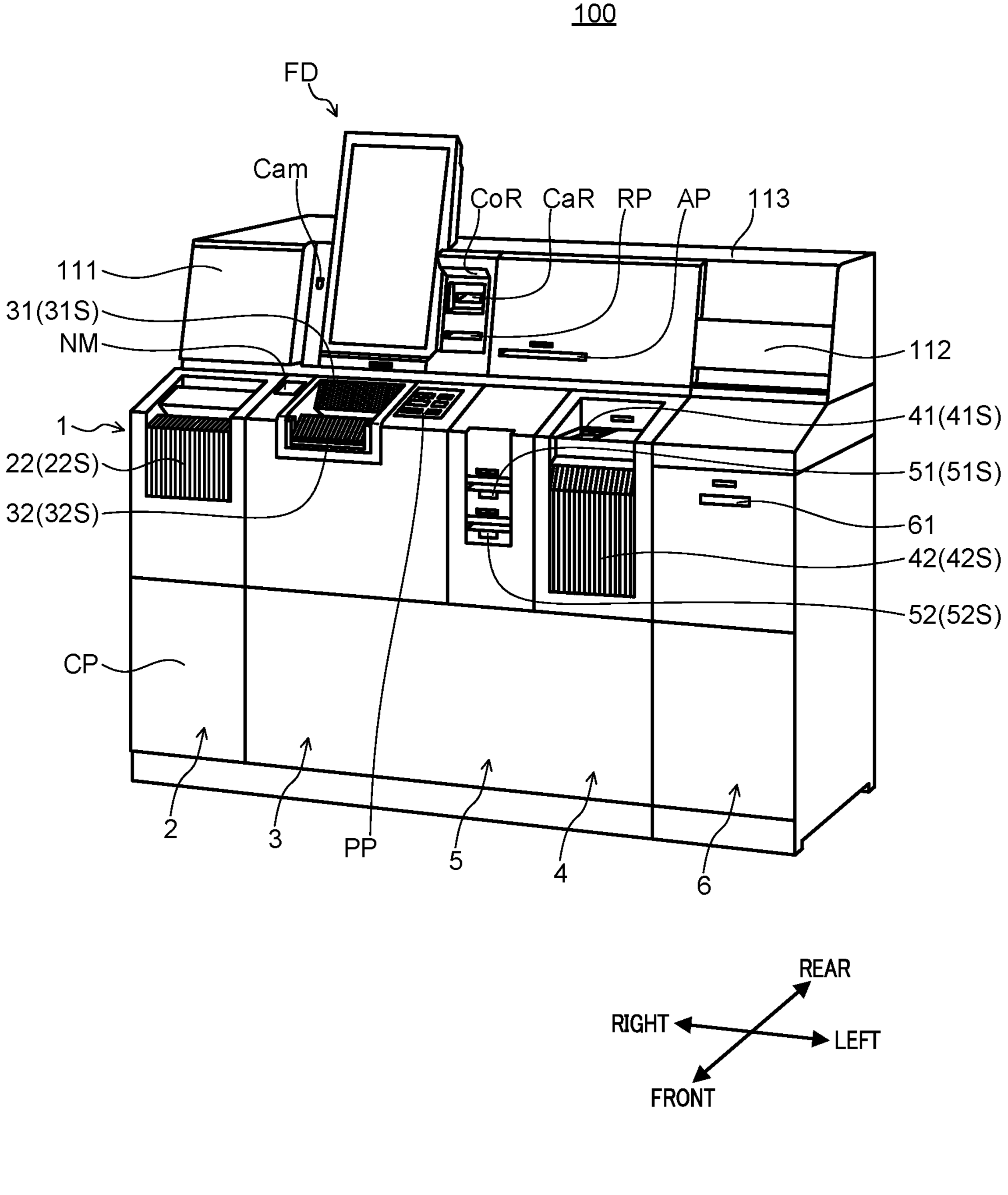
FIG. 2 illustrates exemplary appearance of the medium handling apparatus according to the present embodiment when the medium handling apparatus is viewed from the front thereof.

In the following, the medium handling apparatus 100 according to the present embodiment will be described in detail. FIG. 2 illustrates exemplary appearance of the medium handling apparatus 100 according to the present embodiment when the medium handling apparatus is viewed from the front thereof. FIG. 2 illustrates the front, rear, left, and right directions with the medium handling apparatus 100 as a reference, and the description herein will be made based on these directions.

The medium handling apparatus 100 comprises the following: a rolled coin device 2 that performs processing related to transactions targeting rolled coins; a banknote device 3 that performs processing related to transactions targeting loose banknotes; a loose coin device 4 that performs processing related to transactions targeting loose coins; a check device 5 that performs processing related to transactions targeting checks; and a drop box 6 into which an envelope containing a valuable medium that has not been properly recognized by the medium handling apparatus 100 are dropped.

In the example illustrated in FIG. 2, when the devices are viewed with the medium handling apparatus 100 as the reference, the rolled coin device 2, the banknote device 3, the check device 5, the loose coin device 4, and the drop box 6 are disposed in this order from right to left.

At least one of an inlet and an outlet is provided for each device on the front surface of a housing 1. The rolled coin device 2 comprises an outlet 22 for dispensing rolled coins. The outlet 22 is provided with a shutter 22S for opening and closing the outlet 22.

The banknote device 3 comprises an inlet 31 for accepting banknotes and an outlet 32 for dispensing banknotes. The inlet 31 is provided with a shutter 31S for opening and closing inlet 31, and the outlet 32 is provided with a shutter 32S for opening and closing outlet 32.

The loose coin device 4 comprises an inlet 41 for accepting loose coins and an outlet 42 for dispensing loose coins. The inlet 41 is provided with a shutter 41S for opening and closing inlet 41, and the outlet 42 is provided with a shutter 42S for opening and closing outlet 42.

The check device 5 comprises an inlet 51 for accepting checks and an outlet 52 for feeding checks out. The inlet 51 is provided with a shutter 51S for opening and closing inlet 51, and the outlet 52 is provided with a shutter 52S for opening and closing outlet 52. The outlet 52 may be an outlet part for returning a check deposited from the inlet 51.

The drop box 6 comprises a reception port 61 for accepting an envelope containing a valuable medium that has not been properly recognized. The reception port 61 may be provided with a shutter with a lock.

On the front surface of the housing 1, a front display FD and a pin pad PP are provided as a user interface of the medium handling apparatus 100.

The front display FD has a structure such that a touch pad and a thin display are stacked (touch panel), and performs various displays to a user and accepts input operations from the user.

The pin pad PP accepts input of a personal identification number from a user. The pin pad PP is, for example, a numeric keypad. Herein, a user means a person who conducts a transaction by using the medium handling apparatus 100, and is, for example, a customer who uses a facility where the medium handling apparatus 100 is installed.

In addition, on the front surface of the housing 1, a card reader CaR, a code reader COR, a receipt printer RP, an A4 printer AP, a camera Cam, and an NFC reader NM are provided.

The card reader CaR reads, for example, a cash card of a bank account or a credit card. The code reader CoR reads a barcode, a two-dimensional code, or the like.

The receipt printer RP and the A4 printer AP print information related to the results of processing performed by a user using the medium handling apparatus 100, and provide the printed information to the user.

The camera Cam captures an image of the face of a user using the medium handling apparatus 100 or an administrator of the medium handling apparatus 100, and uses the image as part of the processing history information. In addition, the camera Cam may be used to generate facial image data to be used for facial identification of the user or the administrator.

An administrator of the medium handling apparatus 100 is a person who manages the medium handling apparatus 100 and valuable media, and is, for example, an employee of a facility where the medium handling apparatus 100 is installed.

The NFC reader NM communicates with a customer terminal device 300 using Near Field Communication (NFC).

Figure 3:
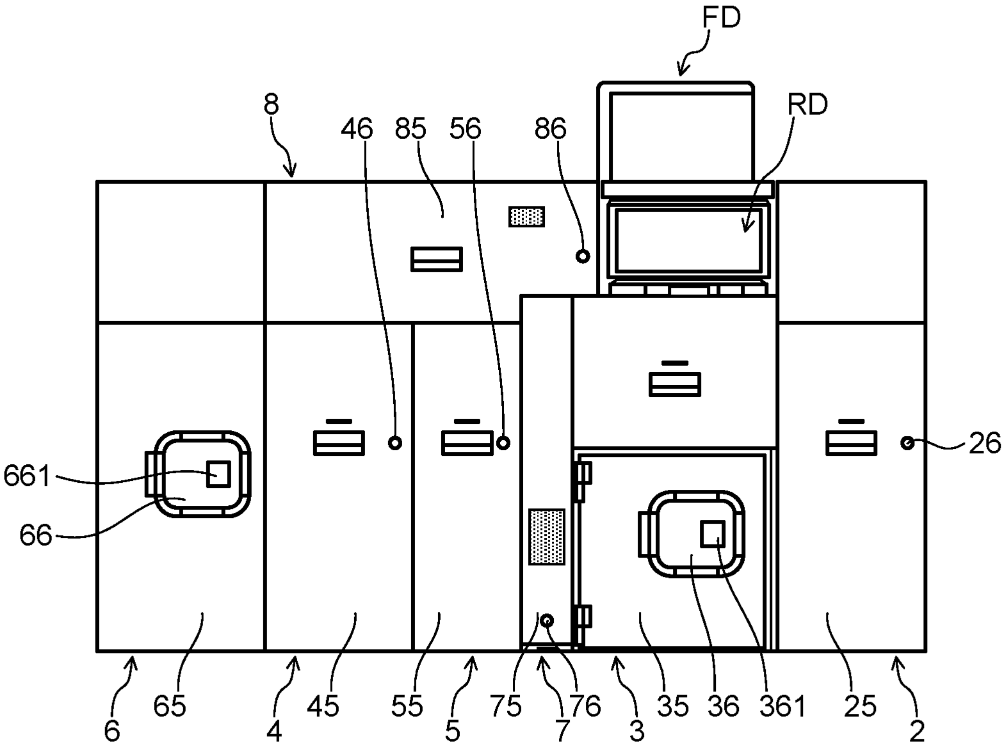
FIG. 3 illustrates exemplary appearance of the medium handling apparatus when the medium handling apparatus is viewed from the rear thereof.

FIG. 3 illustrates exemplary appearance of the medium handling apparatus 100 when the medium handling apparatus is viewed from the rear thereof. The rear surface of the housing 1 is provided with a door 25 of the rolled coin device 2, a door 35 of the banknote device 3, a door 45 of the loose coin device 4, a door 55 of the check device 5, and a door 65 of the drop box 6. These doors 25, 35, 45, 55, and 65 allow an administrator and the like of the medium handling apparatus 100 to reach the inside of each device.

The doors 25, 35, 45, 55, 65 can be locked with locks 26, 36, 46, 56, and 66, respectively. The banknote device 3 and the drop box 6 comprise key input devices 361 and 661 for inputting passwords for unlocking the locks 36 and 66, respectively.

In addition, in the example illustrated FIG. 3, a controller box 7 is provided between the banknote device 3 and the check device 5. The controller box 7 houses a controller corresponding to a control unit 10, which will be described below. The controller box 7 comprises a door 75 and a lock 76.

A peripheral device box 8 is provided on top of the banknote device 3, loose coin device 4, and check device 5. The peripheral device box 8 houses main body parts of, for example, front display FD, pin pad PP, card reader CaR, code reader CoR, receipt printer RP, A4 printer AP, camera Cam, and NFC reader NM illustrated in FIG. 2. The peripheral device box 8 comprises a door 85 and a lock 86.

In addition, on the rear surface of the housing 1, a rear display RD is provided on top of the banknote device 3. In the same manner as in the front display FD, the rear display RD has a structure such that a touch pad and a thin display are stacked (touch panel). The rear display RD can display various information to an administrator and accept input operations from the administrator.

The front display FD, the pin pad PP, and the rear display RD are input units for accepting input from a user. In addition, the front display FD and the rear display RD are also displays for displaying various information.

Hereinafter, the front display FD, the pin pad PP, and the rear display RD may be referred to as input units, and the front display FD and the rear display RD may be referred to displays.

Figure 4:
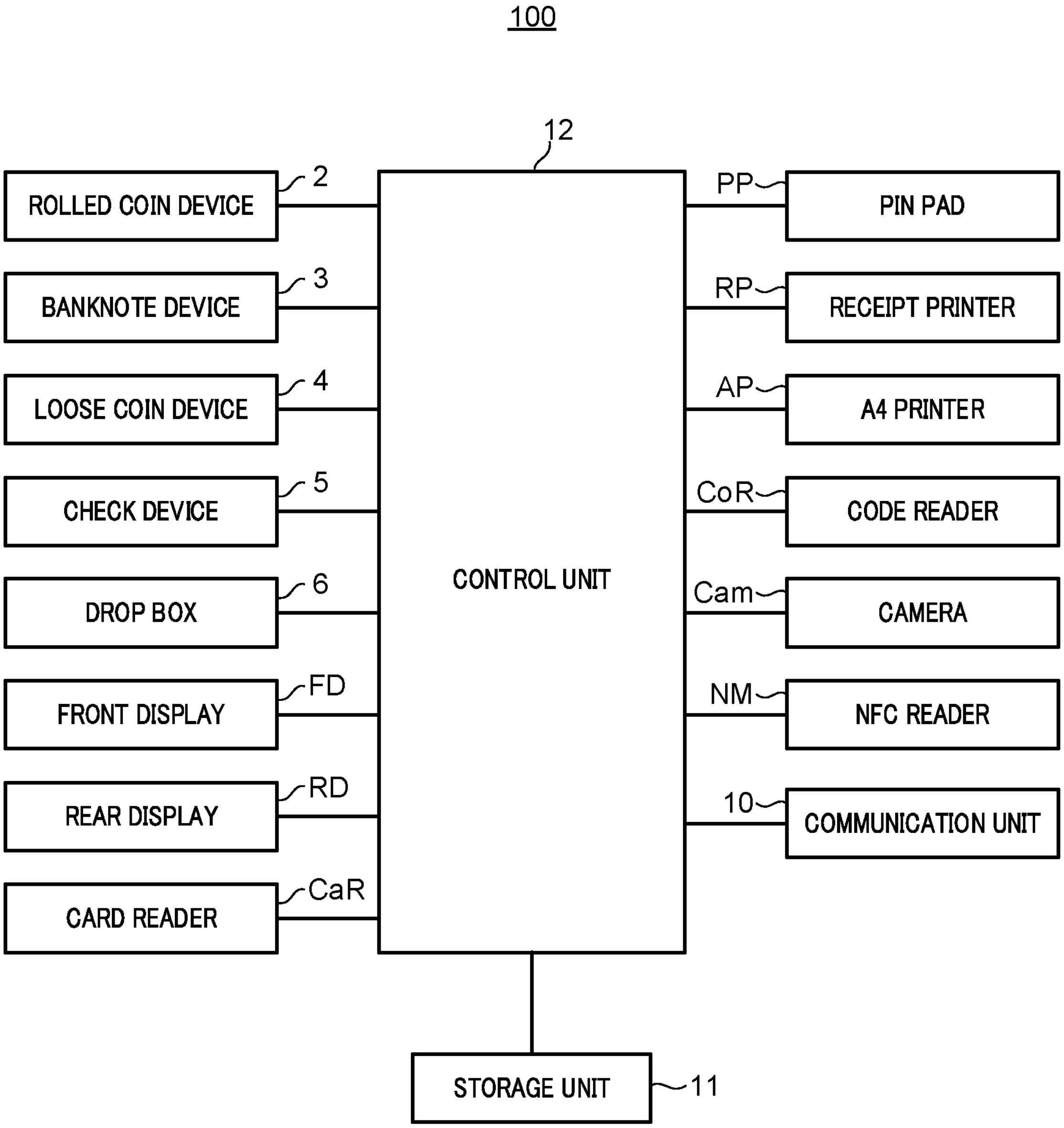
FIG. 4 is a block diagram illustrating exemplary functional blocks of the medium handling apparatus.

FIG. 4 is a block diagram illustrating exemplary functional blocks of the medium handling apparatus 100. The medium handling apparatus 100 comprises a communication unit 10, a storage unit 11, and a control unit 12 in addition to the units described for FIG. 2.

The communication unit 10 is a communication device for communicating with the server device 200 and the terminal device 300. The storage unit 11 is a storage device such as a memory that stores various data and programs necessary for processing executed by the control unit 12. The control unit 12 is a processor for controlling each unit comprised in the medium handling apparatus 100.

For example, when the communication unit 10 receives configuration data defining the configuration of a transaction screen from the server device 200, the control unit 12 configures, based on the configuration data and data for an image stored in the storage unit 11, a transaction screen in which the image is embedded. The control unit 12 then causes a display to display the transaction screen.

For example, this configuration data is data that is written in HTML, and that defines elements (such as fonts, layouts, embedded images, text, hyperlinks, and the like for displaying the transaction screen on the screen), the functions of the transaction screen, screen operations, and the like.

Figure 5:
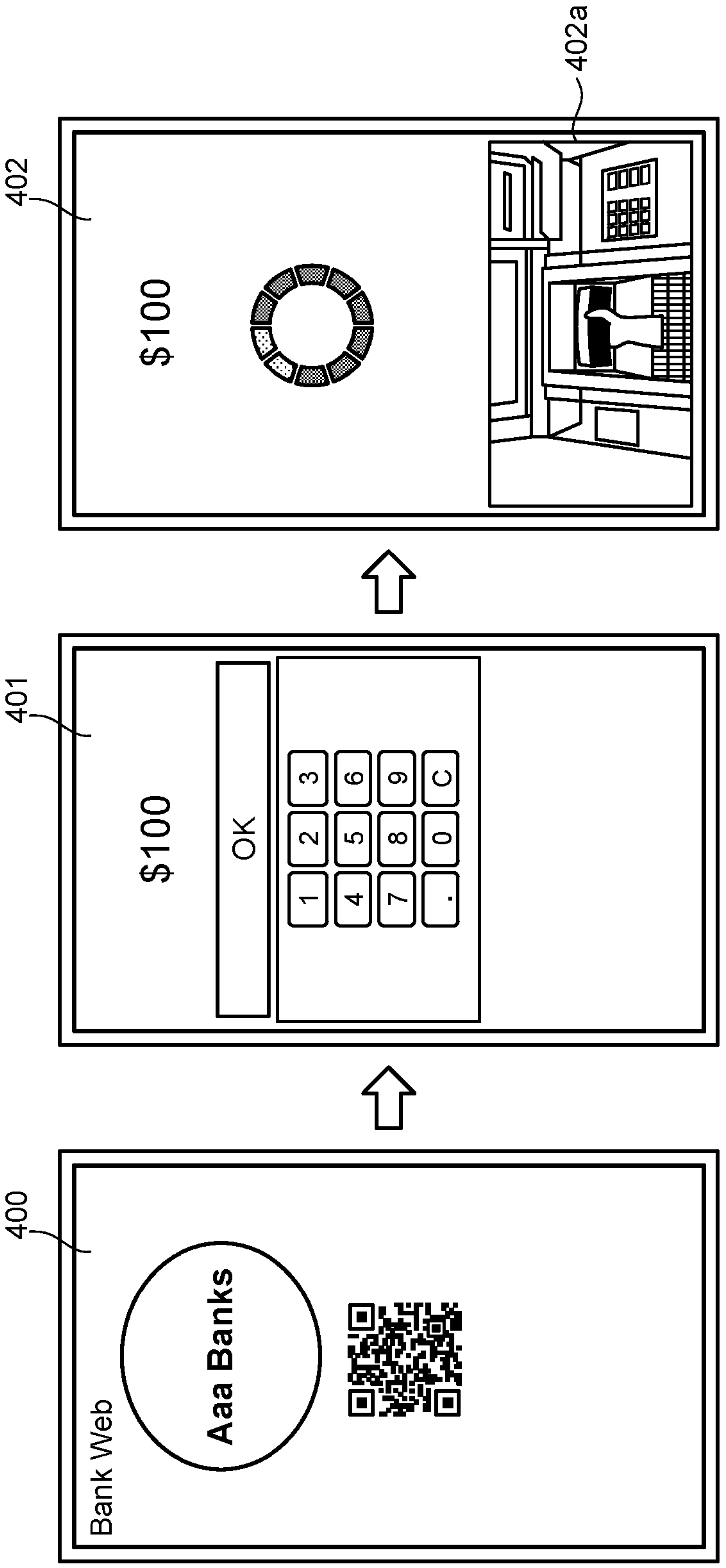
FIG. 5 illustrates an exemplary transaction screen in which a guiding image is embedded.

FIG. 5 illustrates an exemplary transaction screen 402 in which a guiding image 402*a* is embedded. First, the control unit 12 causes the display of the medium handling apparatus 100 to display a transaction screen 400 for a user to log into a WEB (World Wide Web) site that provides transaction services for valuable media. In this example, login is performed by using a two-dimensional code.

When the login is completed, the control unit 12 causes the display to display a transaction screen 401 for performing transactions such as dispensing. The drawing illustrates a case where the user inputs an amount of $100, and processing to withdraw $100 is executed.

Thereafter, the control unit 12 causes the display to display a transaction screen 402 with an embedded guiding image 402*a* that prompts the user to take out the banknotes of $100 from the outlet. The guiding image 402*a* may be a still image or a moving image.

Herein, the transaction screens 400 to 402 are web pages configured by HTML documents, and these web pages are provided by the server device 200. The control unit 12 receives the HTML documents defining the configurations of the transaction screens from the server device 200, and causes the display to display transaction screens 400 to 402 having the defined configurations.

In addition, HTML the document defining the configuration of the transaction screen 402 comprises an iframe tag for embedding the guiding image 402*a* whose data is stored in the storage unit 11 of the medium handling apparatus 100. The control unit 12 embeds the guiding image 402*a* in the transaction screen 402 using this iframe tag, and causes the display to display the screens.

Figure 6:
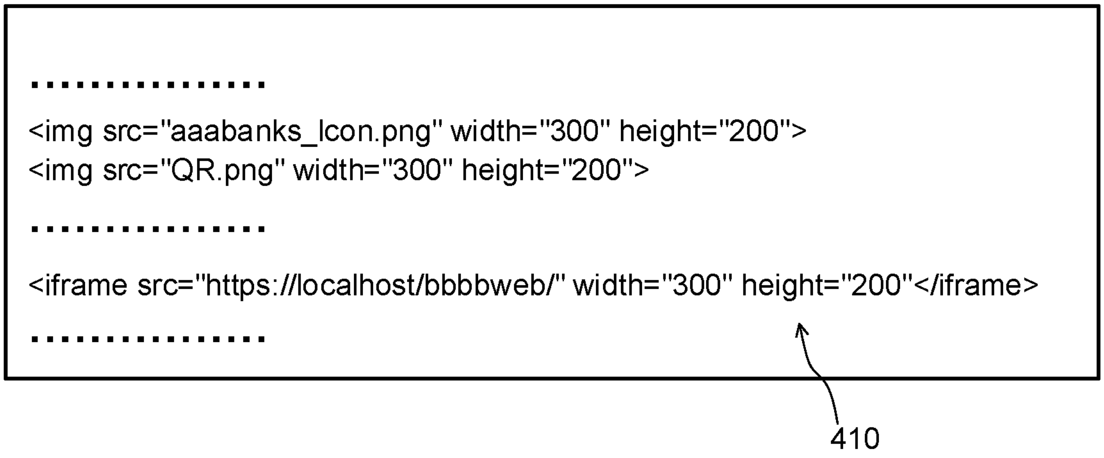
FIG. 6 illustrates an exemplary HTML document for embedding a web page provided by a medium handling apparatus into a web page provided by a server device.

FIG. 6 illustrates an exemplary HTML document for embedding a web page provided by the medium handling apparatus 100 into a web page provided by the server device 200. This HTML document is stored in a storage unit (not illustrated) of the server device 200.

An iframe tag 410 is used for this embedding. With the iframe tag 410, the Uniform Resource Locator (URL) of the web page provided by the medium handling apparatus 100 is specified by the src attribute. In addition, the width and height of the web page to be embedded can also be specified by using the width and height attributes.

Figure 7:
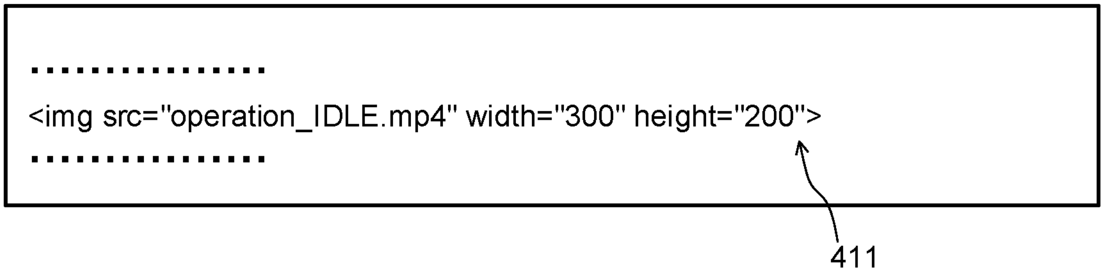
FIG. 7 illustrates an exemplary HTML document configuring a web page in which a guiding image is embedded.

FIG. 7 illustrates an exemplary HTML document for configuring a web page in which the guiding image 402*a* is embedded. This HTML document is stored in the storage unit 11 of the medium handling apparatus 100.

An img tag 411 is used for embedding the guiding image 402*a*. With the img tag 411, the URL of the guiding image 402*a* stored in the storage unit 11 is specified by the src attribute. In addition, the width and height of the guiding image 402*a* can also be specified by using the width and height attributes.

The control unit 12 causes the guiding image 402*a* to be displayed on a WEB page (which is provided by the server device 200) by embedding a WEB page (which is provided by the medium handling apparatus 100 and comprising the guiding image 402*a*) in the WEB page provided by the server device 200. Other processing performed by the control unit 12 will be described in detail below.

Figure 8:
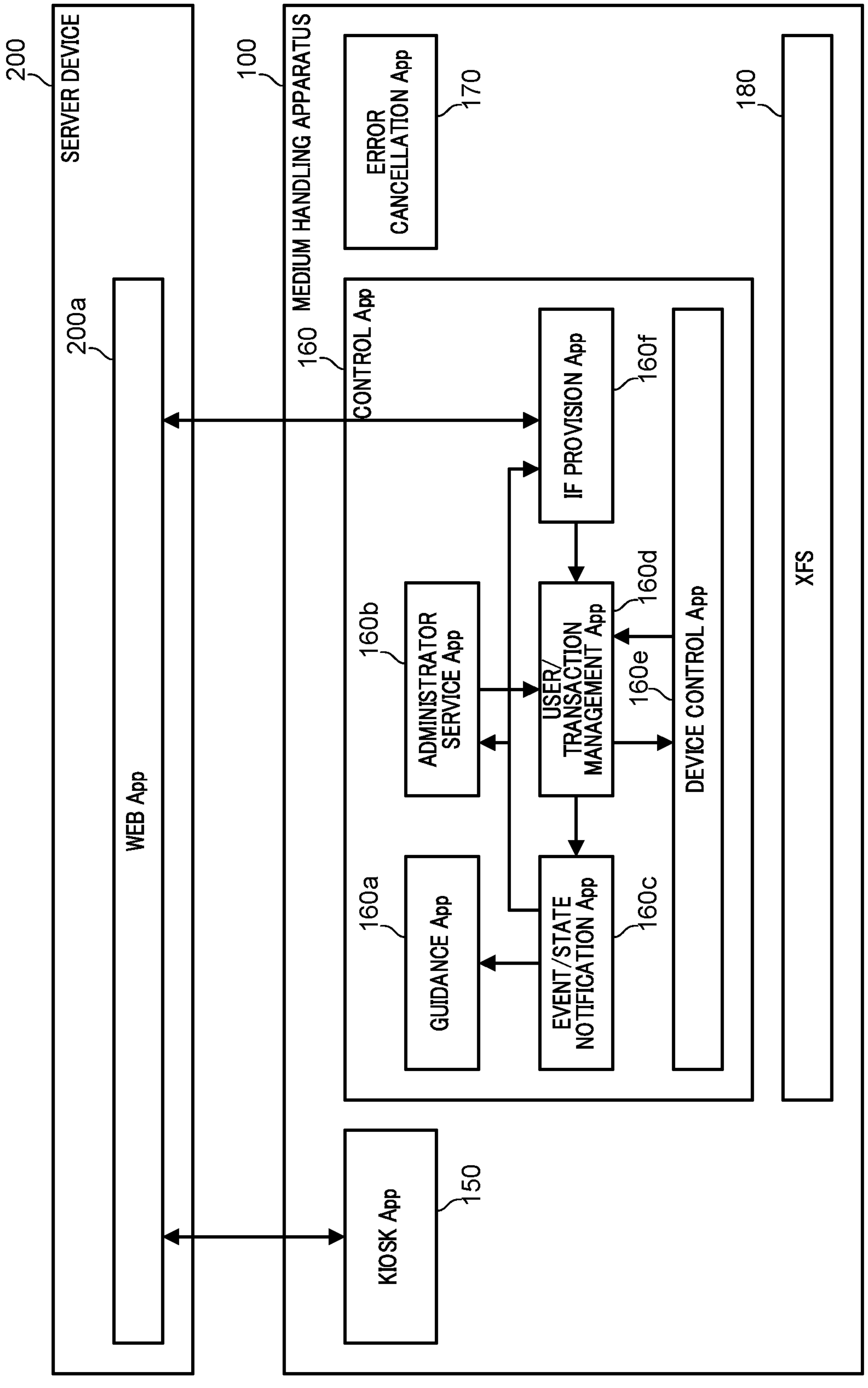
FIG. 8 illustrates exemplary software configurations of the medium handling apparatus and the server device.

FIG. 8 illustrates exemplary software configurations of the medium handling apparatus 100 and the server device 200.

The software installed in the medium handling apparatus 100 comprises a kiosk App 150, a control App 160, an error cancellation App 170, and an XFS 180. The software is stored in the storage unit 11, read from the storage unit 11 by the control unit 12, and executed.

The kiosk App 150 is software that causes the display of the medium handling apparatus 100 to display a screen for a transaction of valuable media. The control App 160 is software that controls each device illustrated in FIG. 4 to perform the transaction.

The error cancellation App 170 is software that guides a user or an administrator to cancel an error that has occurred in each device of the medium handling apparatus 100. Extensions for Financial Services (XFS) 180 is middleware developed by the European Committee for Standardization. The XFS 180 manages communication between the control App 160 and the error cancellation App 170 and the firmware installed in each device.

The control App 160 comprises a guidance App 160*a*, an administrator service App 160*b*, an event/state notification App 160*c*, a user/transaction management App 160*d*, a device control App 160*e*, and an IF provision App 160*f*.

The guidance App 160*a* is software that provides various images to be embedded in transaction screens to the kiosk App 150 configured to display the transaction screens on the display. Such an image is, for example, a guiding image that guides a user when the user performs a transaction.

The administrator service App 160*b* is software that provides screens for the administrator to perform the replenishment and collection processing of banknotes and coins, activation processing of the error cancellation App 170, and the like.

The event/state notification App 160*c* is software that notifies other software installed in the medium handling apparatus 100 and the server device 200 of events that occur in each device and the state of each device.

The user/transaction management App 160*d* is software that manages user information and information on a transaction performed by the user.

The device control App 160*e* is software that communicates with firmware installed in each device via the XFS 180 and controls each device.

The IF provision App 160*f* is software that provides an interface for controlling the medium handling apparatus 100 to a web application 200*a* (web App 200*a*) installed in the server device 200.

The software installed in the server device 200 comprises the web App 200*a*. The web App 200*a* is stored in a storage unit (not illustrated) of the server device 200, and read from the storage unit and executed by a control unit (not illustrated) of the server device 200.

The web App 200*a* communicates with each software installed in the medium handling apparatus 100 by using HTTPS, and controls the medium handling apparatus 100.

Communication between the kiosk App 150 and the control App 160 is performed via the web App 200*a*.

For example, for performing a transaction of a valuable medium, the kiosk App 150 accesses a website provided by the web App 200*a* and displays a two-dimensional code on the display.

When the user operates the terminal device 300 to read the two-dimensional code and log into the website, the web App 200*a* causes the kiosk App 150 to display a transaction screen.

The communication performed in this instance is Internet communication between the kiosk App 150 and the web App 200*a*.

Thereafter, the web App 200*a* causes the control App 160 to execute transaction processing such as depositing, dispensing, and the like.

The communication performed in this instance is communication via a Virtual Private Network (VPN) connection between the control App 160 and the web App 200*a*.

In this manner, the kiosk App 150 and the control App 160 do not directly communicate to each other, but the kiosk App 150 receives a request to display the transaction screen from the web App 200*a*, and the control App 160 receives a request to execute the transaction from the web App 200*a*. Therefore, software on the medium handling apparatus 100 side can be easily developed.

Figure 9:
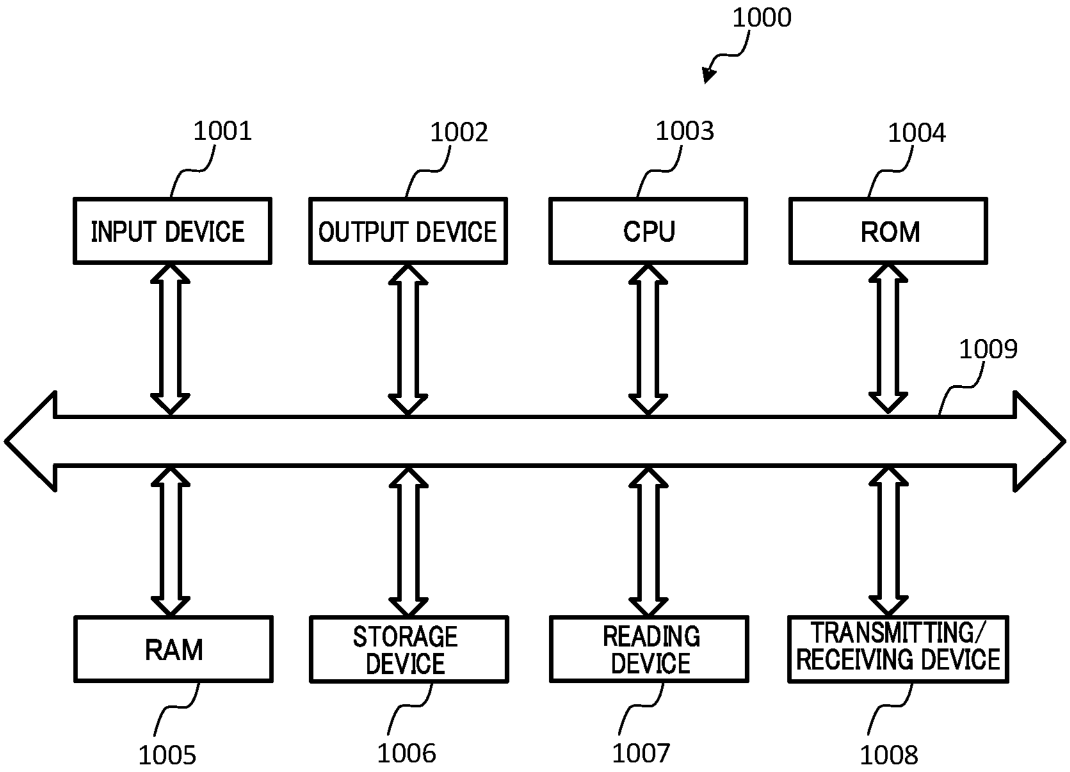
FIG. 9 illustrates an exemplary hardware configuration of the medium handling apparatus.

FIG. 9 illustrates an exemplary hardware configuration of the medium handling apparatus 100.

A computer 1000 comprises an input device 1001, an output device 1002, a CPU 1003, a read only memory (ROM) 1004, a random access memory (RAM) 1005, a storage device 1006, a reading device 1007 that reads information from various recording media, and a transmitting/receiving device 1008. These devices are connected each other by a bus 1009.

The front display FD and the pin pad PP illustrated in FIG. 2 and the rear display RD illustrated in FIG. 3 are examples of the input device 1001. The front display FD and the rear display RD are examples of output device 1002. The communication unit 10, the storage unit 11, and control unit 12 illustrated FIG. 4 correspond to the transmitting/receiving device 1008, the storage device 1006, and the CPU 1003, respectively.

The reading device 1007 reads programs for realizing the functions of the above devices from a recording medium with the programs recorded thereon, and stores the programs in the storage device 1006. Alternatively, the transmitting/receiving device 1008 communicates with a system device connected to the network, and stores the programs downloaded from the system device in the storage device 1006.

The CPU 1003 corresponding to the control unit 12 copies a program stored in the storage device 1006 into the RAM 1005, and sequentially reads instructions comprised in the program from the RAM 1005 and executes the instructions. Each functional block of the medium handling apparatus 100 illustrated in FIG. 4 thus operates.

In the following, the transaction processing for a valuable medium will be described with reference to the dispensing processing performed by the banknote device 3 as an example. This dispensing processing is performed by the medium handling apparatus 100 and the server device 200.

Figure 10:
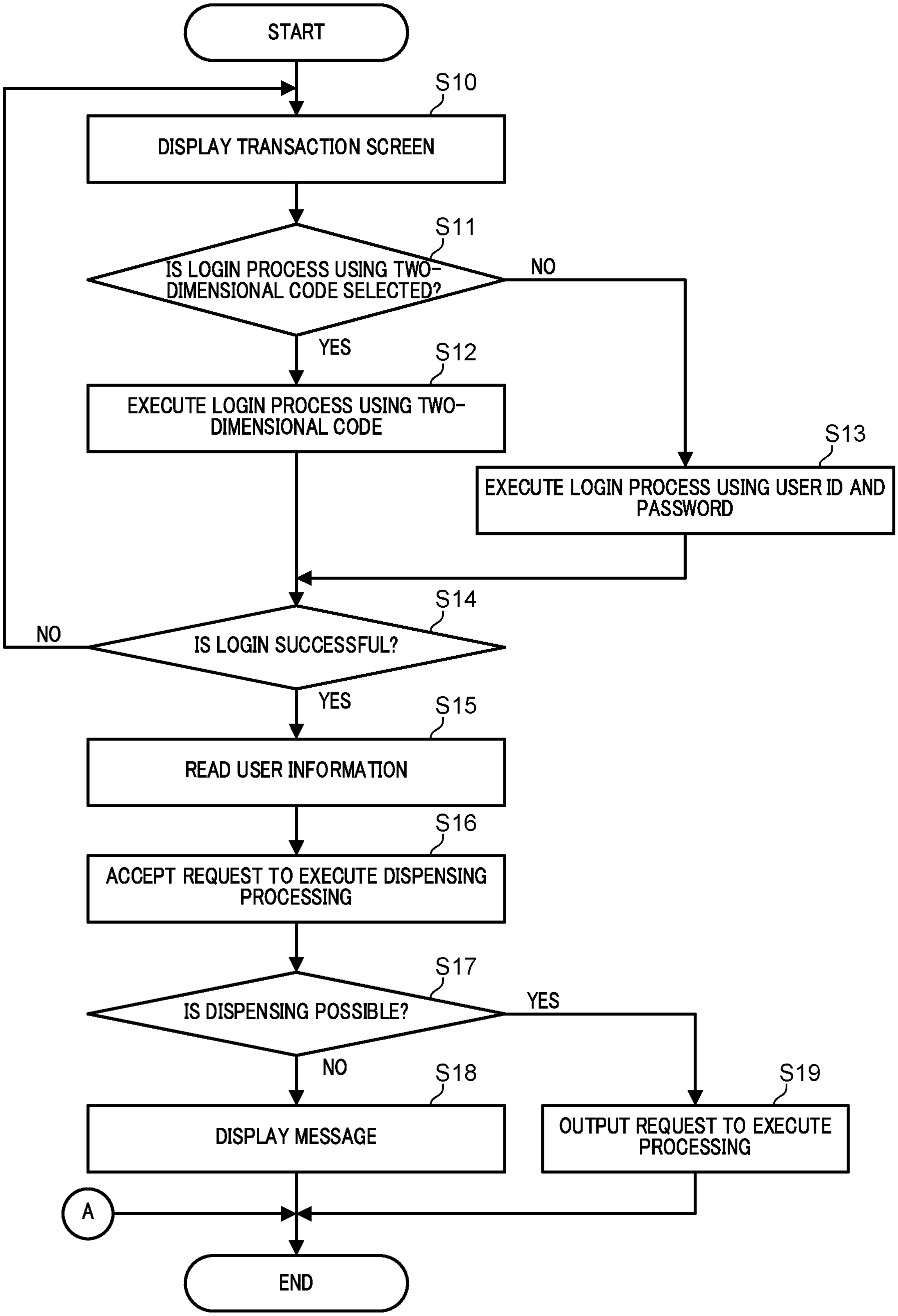
FIG. 10 is a flowchart illustrating exemplary dispensing processing performed by the control unit of the medium handling apparatus.
Figure 11:
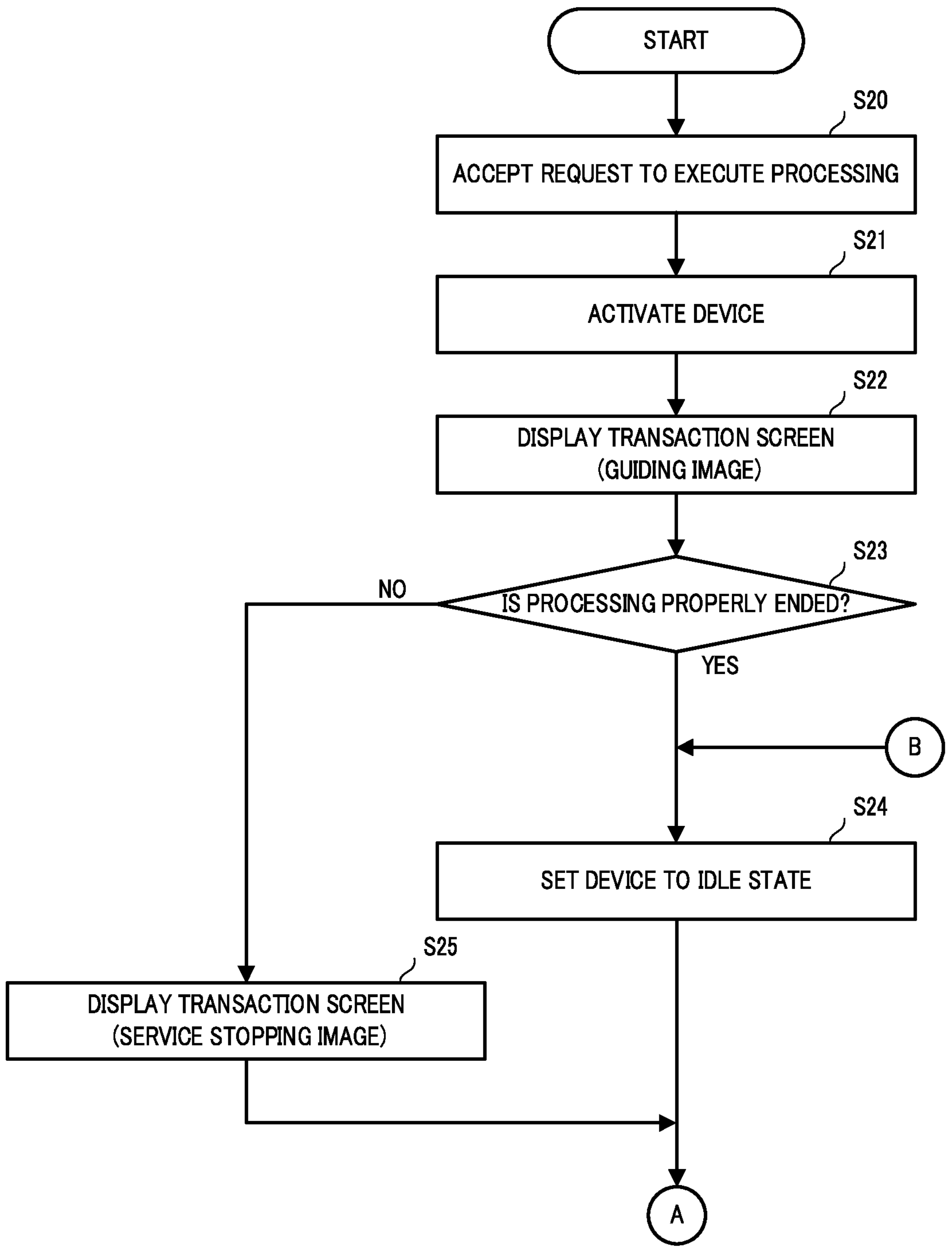
FIG. 11 is a flowchart illustrating exemplary dispensing processing performed by the control unit of the medium handling apparatus.
Figure 12:
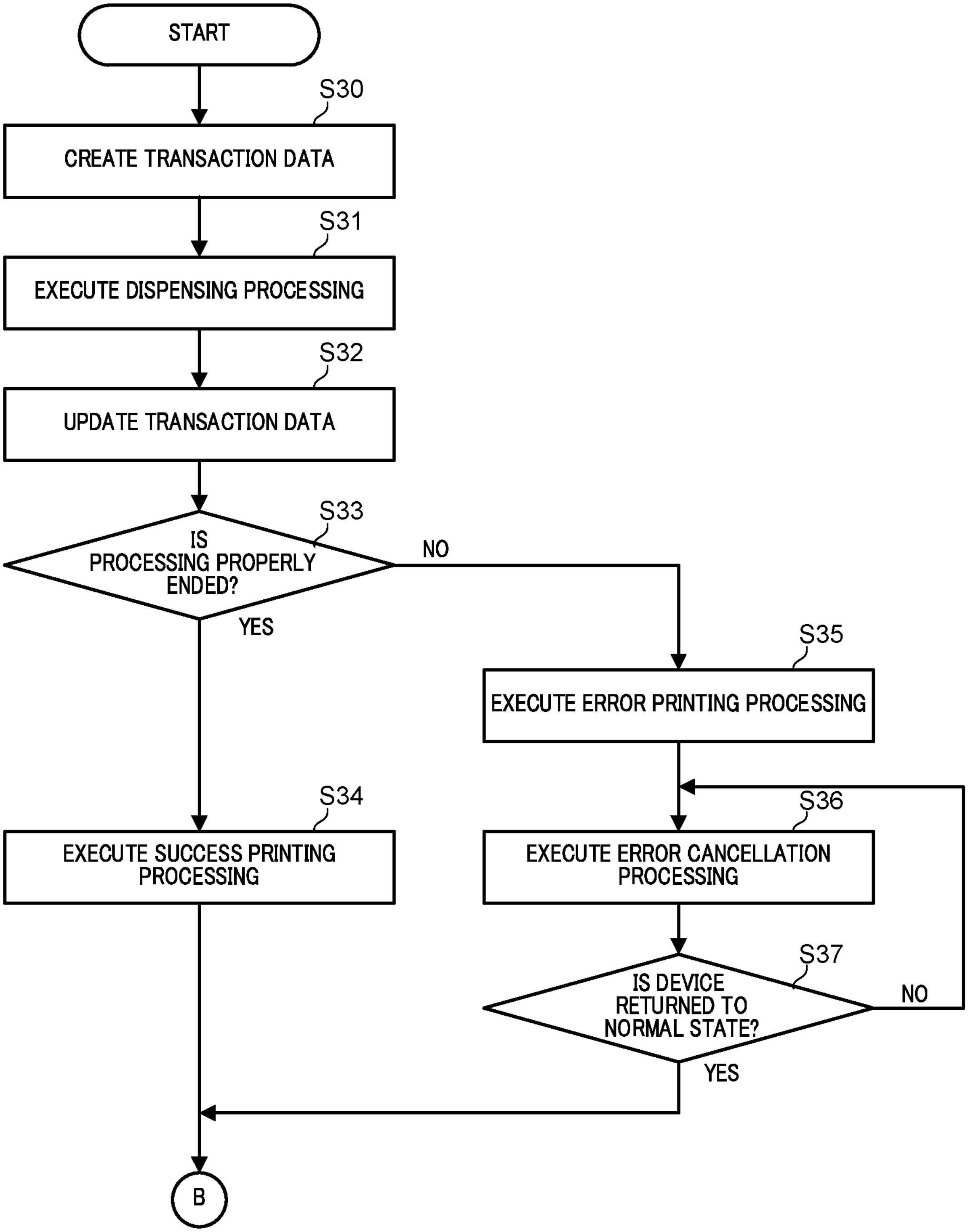
FIG. 12 is a flowchart illustrating exemplary dispensing processing performed by the control unit of the medium handling apparatus.

FIGS. 10 to 12 are flowcharts illustrating exemplary dispensing processing performed by the control unit 12 of the medium handling apparatus 100.

The processing illustrated in FIG. 10 corresponds to the processing performed by the kiosk App 150, the processing illustrated in FIG. 11 corresponds to the processing performed by the control App 160, and the processing illustrated in FIG. 12 corresponds to the processing performed by the control App 160 and the error cancellation App 170.

As illustrated FIG. 10, when a user stands in front of the medium handling apparatus 100 and touches the input unit configured with a touch panel, the control unit 12 (kiosk App 150) displays a transaction screen based on an HTML document transmitted by the server device 200 (step S10).

The control unit 12 then determines whether the user has selected a login process that uses a two-dimensional code (step S11). When the user selects the login process using the two-dimensional code (step S11, YES), the control unit 12 executes the login process using the two-dimensional code (step S12).

When the user does not select the login process using the two-dimensional code (step S11, NO), the control unit 12 executes the login process using the user ID and password (step S13).

The control unit 12 then determines whether the user's login has been successful (step S14). When the login is not successful (step S14, NO), the subsequent processing from step S10 is executed again.

When the login is successful (step S14, YES), the control unit 12 reads user information from the server device 200 (step S15). The control unit 12 then accepts a request to execute dispensing processing comprising the dispensing amount and the like from the user (step S16).

Thereafter, the control unit 12 determines whether the dispensing of this amount is possible (step S17). When the dispensing is not possible due to, for example, the amount of money in the user's account being insufficient for the dispensing (step S17, NO), the control unit 12 causes the display to display a message indicating that dispensing is not possible (step S18), and ends this dispensing processing.

When the dispensing is possible (step S17, YES), the control unit 12 outputs a request to execute the dispensing processing to the control App 160 (step S19).

Thereafter, as illustrated in FIG. 11, the control unit 12 (control App 160) accepts a request to execute the dispensing processing (step S20). The control unit 12 then activates the banknote device 3 (step S21). Subsequently, the control unit 12 causes the display to display a transaction screen comprising a guiding image (step S22). The control unit 12 executes the dispensing processing illustrated in FIG. 12 in parallel with the displaying.

The guiding image displayed in this instance is, for example, an image that guides the user to collect a banknote from the outlet, and is an image that is stored in the storage unit 11. On the basis of the guiding image and an HTML document received from the server device 200, the control unit 12 configures a transaction screen in which the guiding image is embedded, and causes the display to display the transaction screen.

The control unit 12 then determines whether the dispensing processing has properly ended (step S23). When the dispensing processing has properly ended (step S23, YES), the control unit 12 sets the banknote device 3 to an idle state (step S24).

When the dispensing processing has not properly ended (step S23, NO), the control unit 12 causes the display to display a transaction screen comprising a guiding image (step S25). The case where the dispensing processing is not properly ended is, for example, the case where the dispensing processing is stopped due to a banknote jamming the banknote device 3.

In addition, the guiding image displayed in this instance is an image indicating that the service has stopped, and is an image stored in the storage unit 11. On the basis of the guiding image and an HTML document received from the server device 200, the control unit 12 configures a transaction screen in which the guiding image is embedded, and causes the display to display the transaction screen.

In addition, as illustrated in FIG. 12, the control unit 12 (control App 160) creates transaction data comprising information such as the amount and time related to the current transaction, in parallel with the display processing of the transaction screen in step S22 illustrated in FIG. 11 (step S30).

The control unit 12 then controls the banknote device 3 to execute dispensing processing of transporting a banknote to the outlet of the banknote device 3 (step S31). When this dispensing processing has not properly ended, the control unit 12 detects the fact in the processing of step S23 illustrated in FIG. 11.

Thereafter, the control unit 12 updates the transaction data (step S32). Even when the dispensing processing is not properly ended, the control unit 12 updates the transaction data by registering the information indicating the fact.

When the dispensing processing has properly ended (step S33, YES), the control unit 12 controls the receipt printer RP or the A4 printer AP illustrated in FIG. 2 to execute success printing processing to print information indicating that the dispensing processing is successfully ended (step S34). The processing then moves to step S24 illustrated in FIG. 11.

When the dispensing processing has not properly ended (step S33, NO), the control unit 12 controls the receipt printer RP or the A4 printer AP to execute error printing processing to print information indicating that the dispensing processing is not successfully ended (step S35).

Further, the control unit 12 (error cancellation App 170) executes error cancellation processing to guide the administrator of the medium handling apparatus 100 to remove the jamming banknote (step S36).

The control unit 12 then determines whether the error cancellation processing has been successful and the banknote device 3 has returned to the normal state (step S37). When the banknote device 3 has not returned to the normal state (step S37, NO), the subsequent processing from step S36 is executed again.

When the banknote device 3 has returned to the normal state (step S37, YES), the processing moves to step S24 illustrated in FIG. 11.

Herein, the dispensing processing performed by the medium handling apparatus 100 is described; however, the same processing is performed for the deposit processing, except that the transaction is a transaction of depositing.

In addition, the guiding images stored in the storage unit 11 may comprise a plurality of guiding images to be sequentially embedded in a transaction screen or transaction screens according to the progress of the transaction. Each guiding image may be a moving image. In this case, the control unit 12 configures a transaction screen in which each guiding image is embedded according to the progress of the transaction, and causes the display unit to display the transaction screen.

Figure 13:
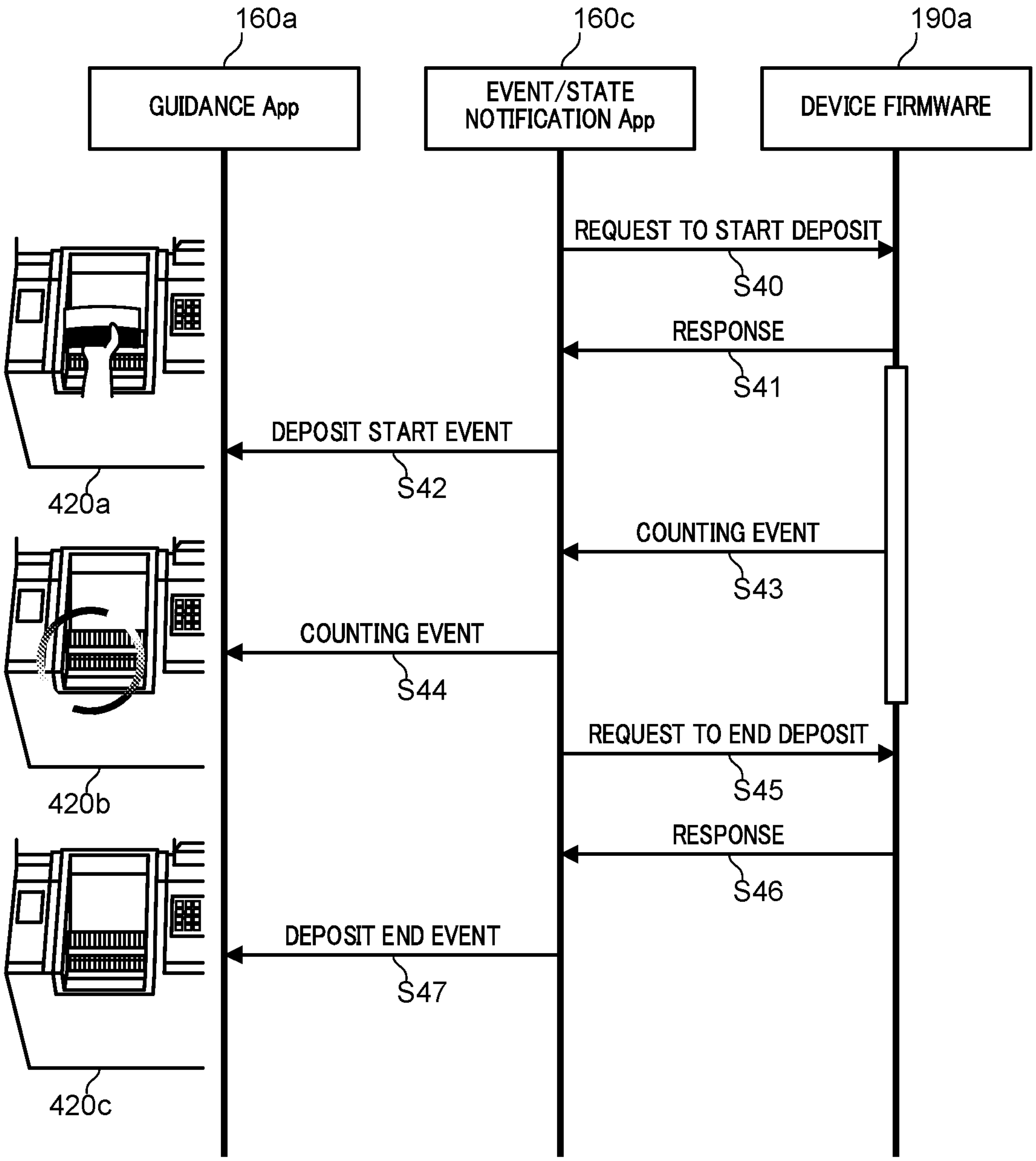
FIG. 13 illustrates exemplary guiding images that are sequentially embedded in a transaction image according to the progress of the transaction.

FIG. 13 illustrates exemplary guiding images 420*a* to 420*c* that are sequentially embedded in a transaction image according to the progress of the transaction. FIG. 13 illustrates deposit processing of banknotes performed by software installed in the medium handling apparatus 100, and guiding images 420*a* to 420*c* changing as the deposit processing progresses.

As illustrated in FIG. 13, when the event/state notification App 160*c* sends a request to start the deposit to the firmware 190*a* of the banknote device 3 (step S40), and a response therefor is made (step S41), the event/state notification App 160*c* notifies the guidance App 160*a* of a deposit start event (step S42).

The guiding image 420*a* prompting the user to make a deposit is embedded in the transaction screen and displayed on the display.

When the transaction progresses and the banknote device 3 executes the counting processing of the deposited banknotes, the firmware 190*a* of the banknote device 3 notifies the event/state notification App 160*c* of the occurrence of a counting event (step S43). Further, the event/state notification App 160*c* notifies the guidance App 160*a* of the counting event (step S44).

In this case, in place of the guiding image 420*a*, the guiding image 420*b* prompting the user to wait is embedded in the transaction screen and displayed on the display.

As the transaction further progresses, the event/state notification App 160*c* sends a request to end the deposit to the firmware 190*a* of the banknote device 3 (step S45). When a response therefor is made (step S46), the event/state notification App 160*c* notifies the guidance App 160*a* of a deposit end event (step S47).

In this case, in place of the guiding image 420*b*, the guiding image 420*c*, indicating that the deposit processing has been completed, is embedded in the transaction screen and displayed on the display.

The guiding images 420*a* to 420*c* illustrated in FIG. 13 are stored in the storage unit 11 of the medium handling apparatus 100; therefore, the guiding images 420*a* to 420*c* can be easily changed without changing the HTML document transmitted from the server device 200.

For example, a situation in which the guiding images 420*a* to 420*c* are changed may be the following situation: an image displayed on the same device is updated to a new image; or for changing the configuration of the medium handling apparatus 100 to add a new device, a new guiding image is prepared for the additional device.

Figure 14:
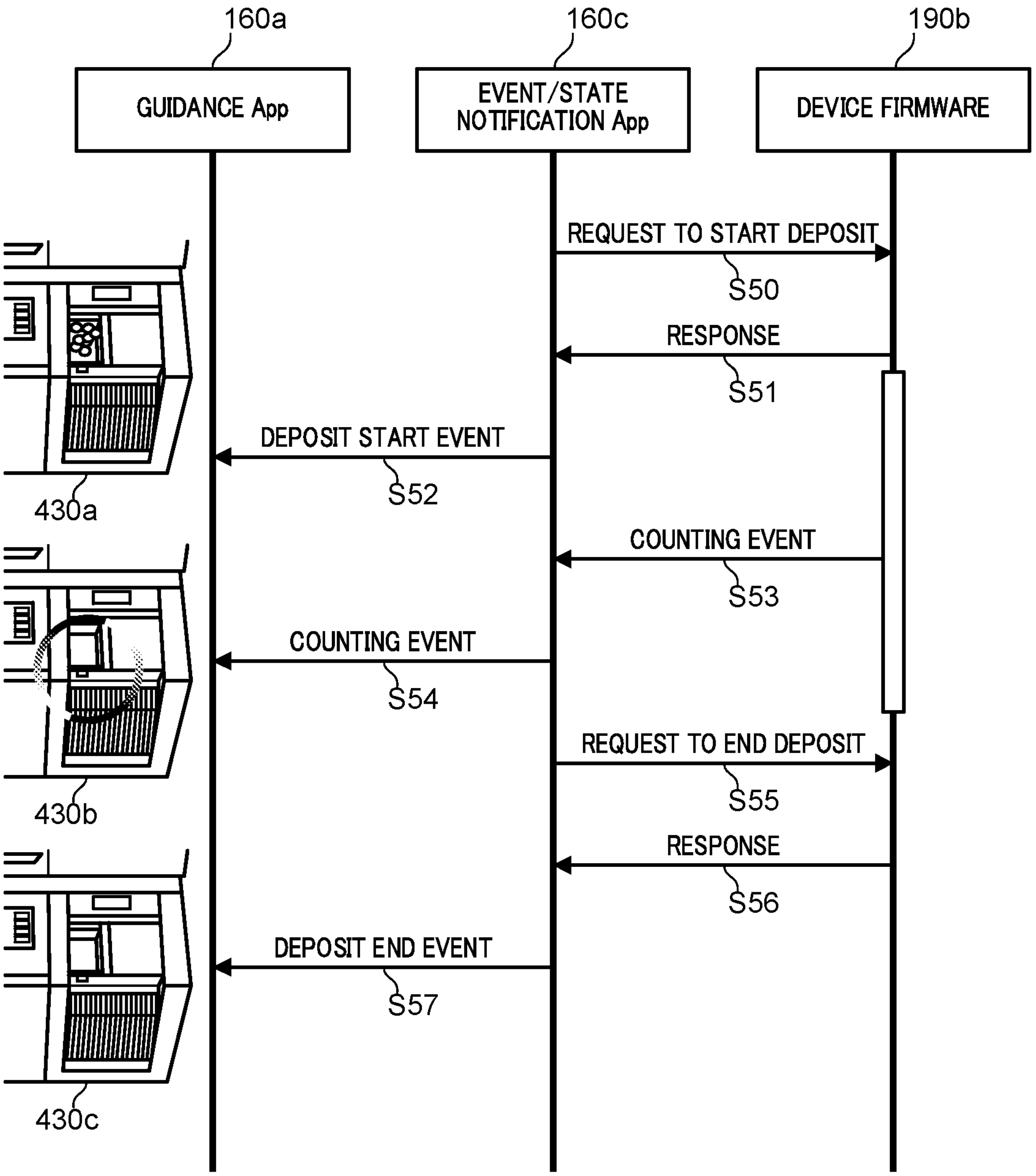
FIG. 14 illustrates exemplary guiding images displayed on a loose coin device.

FIG. 14 illustrates exemplary guiding images 430*a* to 430*c* displayed on the loose coin device 4. Herein, described is a case in which the guiding images 420*a* to 420*c* illustrated in FIG. 13 are changed to guiding images 430*a* to 430*c* as the banknote device 3 is replaced with the loose money device 4.

FIG. 14 illustrates deposit processing of loose coins performed by software installed in the medium handling apparatus 100, and guiding images 430*a* to 430*c* changing as the deposit processing progresses.

In this case, when the event/state notification App 160*c* sends a request to start the deposit to the firmware 190*b* of the loose coin device 4 (step S50), and a response therefor is made (step S51), the event/state notification App 160*c* notifies the guidance App 160*a* of a deposit start event (step S52).

The guiding image 430*a* prompting the user to make a deposit is embedded in the transaction screen and displayed on the display.

When the transaction progresses and the loose coin device 4 executes the counting processing of the deposited coins, the firmware 190*b* of the loose coin device 4 notifies the event/state notification App 160*c* of the occurrence of a counting event (step S53). Further, the event/state notification App 160*c* notifies the guidance App 160*a* of the counting event (step S54).

In this case, in place of the guiding image 430*a*, the guiding image 430*b* prompting the user to wait is embedded in the transaction screen and displayed on the display.

As the transaction further progresses, the event/state notification App 160*c* sends a request to end the deposit to the firmware 190*b* of the loose coin device 4 (step S55). When a response therefor is made (step S56), the event/state notification App 160*c* notifies the guidance App 160*a* of a deposit end event (step S57).

In this case, in place of the guiding image 430*b*, the guiding image 430*c*, indicating that the deposit processing has been completed, is embedded in the transaction screen and displayed on the display.

The size of the guiding image stored in storage unit 11 may be the same as the size of the display area specified in the HTML document, which is transmitted from the server device 200 and defines the configuration of the transaction screen.

Figure 15A:
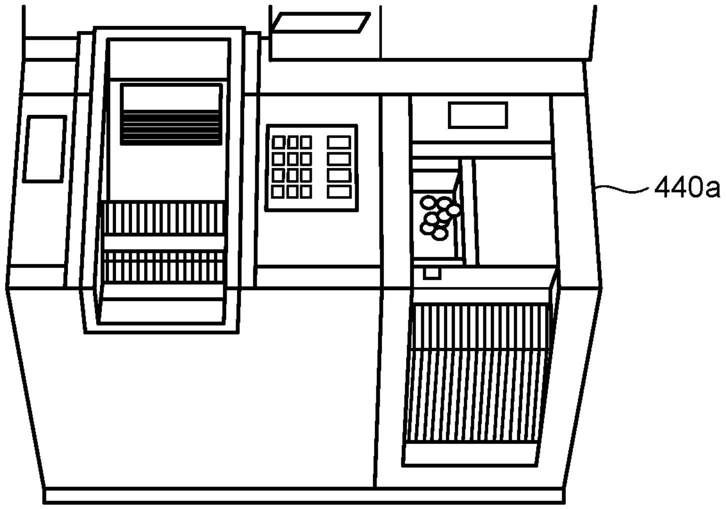
FIG. 15A illustrates an exemplary guiding image prepared in the same size as the display area of the guiding image on the transaction screen.
Figure 15B:
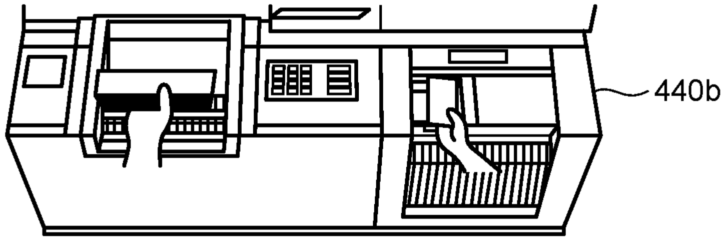
FIG. 15B illustrates an exemplary guiding image prepared in the same size as the display area of the guiding image on the transaction screen.
Figure 15C:
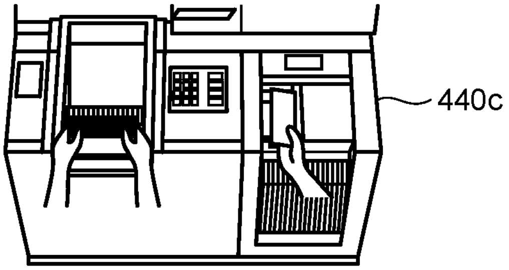
FIG. 15C illustrates an exemplary guiding image prepared in the same size as the display area of the guiding image on the transaction screen.

FIGS. 15A to 15C illustrate exemplary guiding images 440*a* to 440*c* prepared in the same size as the display areas of the guiding images on transaction screens. The size of guiding image 440*a* in FIG. 15A is 1024×768 pixels, the size of guiding image 440*b* in FIG. 15B is 1024×384 pixels, and the size of guiding image 440*c* in FIG. 15C is 358×268 pixels.

By preparing guiding images each in the same size as the display area of a guiding image on a transaction screen in this manner, image enlargement or reduction processing can be omitted, thereby preventing the image from becoming rough or difficult to see.

In the following, described is an error cancellation screen that prompts an administrator of the medium handling apparatus 100 to clear the error by removing a banknote or the like jamming medium handling apparatus 100. The error cancellation screen is displayed by the error cancellation App 170 in the processing of step S36 in FIG. 12.

Figure 16:
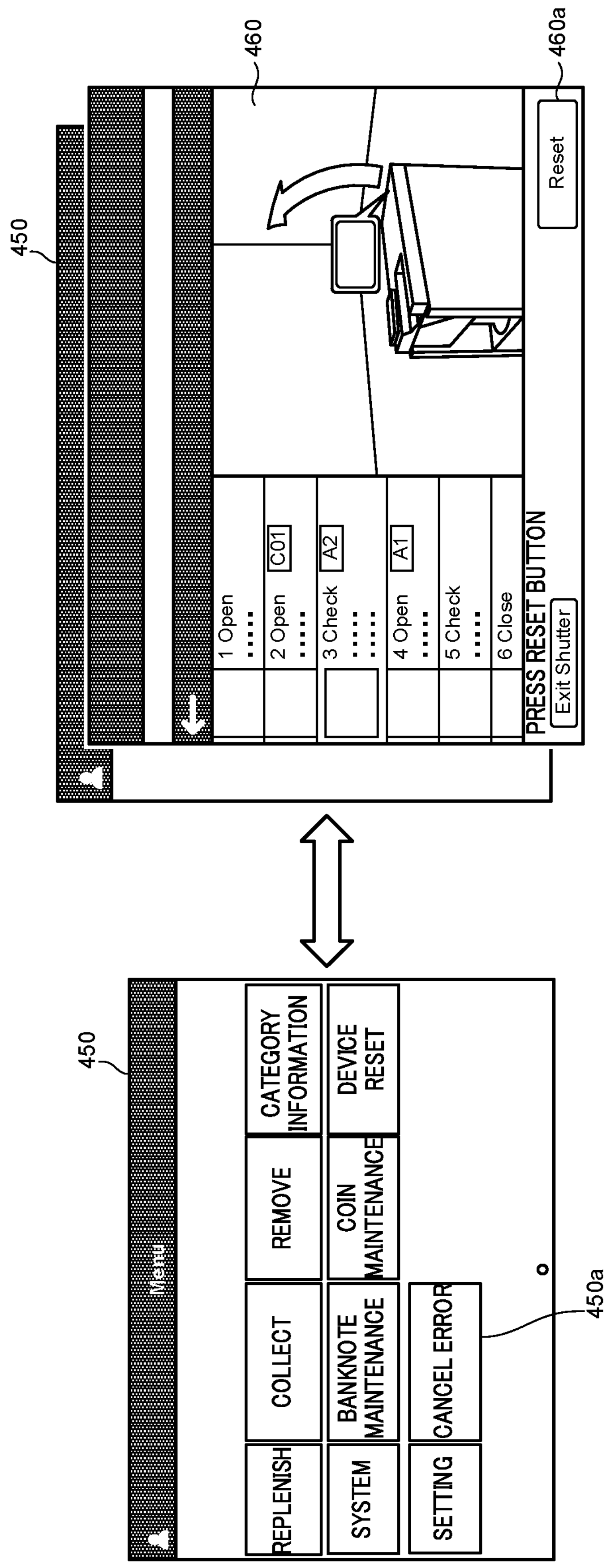
FIG. 16 illustrates an exemplary error cancellation screen displayed by the error cancellation App.

FIG. 16 illustrates an exemplary error cancellation screen 460 displayed by the error cancellation App 170.

When an error cancellation button 450*a* on a menu screen 450 displayed on the display illustrated in FIG. 16 is pressed by the administrator, the control unit 12 causes the error cancellation screen 460 to be displayed in the foreground so as to be superposed on other displayed screens, such as the menu screen 450.

Error cancellation screen configuration data that defines the configuration of the error cancellation screen 460 and data of an error cancellation image that is an image displayed on the error cancellation screen 460 are stored in the storage unit 11 of the medium handling apparatus 100.

When the error cancellation button 450*a* is pressed on the menu screen 450, the control unit 12 reads the error cancellation screen configuration data and the data of the error cancellation image from the storage unit 11, configures the error cancellation screen 460 from the read data, and causes the display to display the screen.

When the user removes the jamming banknote or the like and presses the reset button 460*a* displayed on the error cancellation screen 460, the control unit 12 erases the error cancellation screen 460 and displays the originally displayed menu screen 450.

In addition, the administrator can select whether to display the following screens on the front display FD located on the front surface of the medium handling apparatus 100 or on the rear display RD located on the back surface of the medium handling apparatus 100—the screens are menu screen 450 and error cancellation screen 460 illustrated in FIG. 16 and a login screen for the administrator that allows the administrator to operate the menu screen 450. Hereinafter, the screens operated by the administrator, such as the login screen and menu screen 450, may be simply referred to as operation screens.

For example, the following configuration is also possible: the display destination of the operation screen is set in advance on the front display FD or the rear display RD, and the administrator can change the display destination setting by operating an input unit. The setting information of the display destination is transmitted from the medium handling apparatus 100 to the server device 200 and stored in the storage unit of the server device 200.

Thereafter, when the server device 200 accepts a request to display an operation screen from the medium handling apparatus 100, the server device 200 controls the medium handling apparatus 100 to display the operation screen on the display destination when the display destination has been set in advance, or on a changed display destination when the display destination has been changed.

For example, for displaying an operation screen, the control unit 12 of the medium handling apparatus 100 adds a parameter specifying the display destination of the operation screen to the URL of the WEB page of the operation screen to be transmitted to the server device 200. In this manner, the server device 200 can easily acquire information on the display destination desired by the administrator.

The server device 200 having acquired this information transmits, to the medium handling apparatus 100, an HTML document that configures an operation screen suitable for the display, which is the display destination specified by the parameter. At the same time, the server device 200 requests the medium handling apparatus 100 to display the operation screen on the display of the display destination. The medium handling apparatus 100 having received this HTML document displays the operation screen on the display specified by the above parameter in response to the request from the server device 200.

Figure 17A:
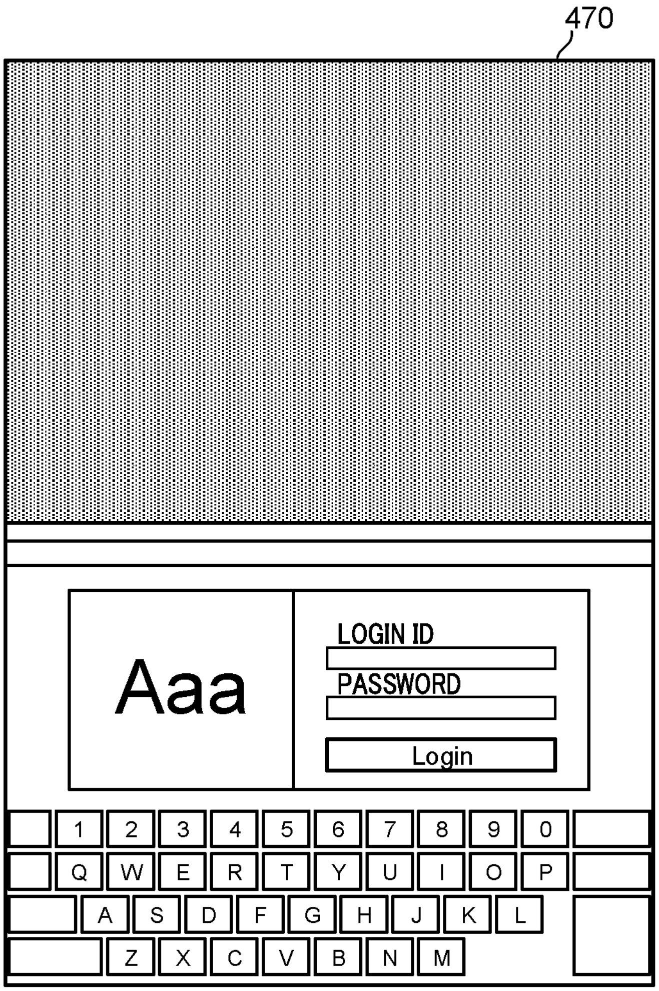
FIG. 17A illustrates an exemplary login screen for an administrator displayed on the front display.

FIG. 17A illustrates an exemplary login screen 470 for an administrator displayed on the front display FD. When the administrator successfully logs in, the menu screen 450 and error cancellation screen 460 illustrated in FIG. 16 are displayed in place of the login screen 470.

Regarding the login screen 470 displayed on the front display FD, which is a vertically long display, nothing is displayed in the upper half thereof, and fields for entering the login ID and password for the administrator to log in and a virtual keyboard are displayed in the lower half thereof.

In order to display such a login screen 470 on the front display FD, the control unit 12 of the medium handling apparatus 100 transmits, for example, a URL "https://localhost/ccc/?xyz=front" to the server device 200. Herein, "https://localhost/ccc/" is the URL of the login screen 470, and xyz is a parameter indicating the display destination of the login screen 470. In this case, xyz is set to front, that is, to the front display FD.

On the other hand, for the rear display RD, the control unit 12 of the medium handling apparatus 100 transmits, for example, a URL "https://localhost/ccc/ddd/?xyz=rear" to the server device 200.

Herein, "https://localhost/ccc/ddd/" is the URL of the display screen that cannot be operated by the administrator. Furthermore, xyz is set to rear, that is, to the rear display RD.

The control unit 12 of the medium handling apparatus 100 receives an HTML document configuring a WEB page corresponding to the above URL from the server device 200. The control unit 12 then displays the login screen 470, which can be operated by the administrator, on the front display FD and displays the display screen, which cannot be operated by the administrator, on the rear display RD in the medium handling apparatus 100.

Figure 17B:
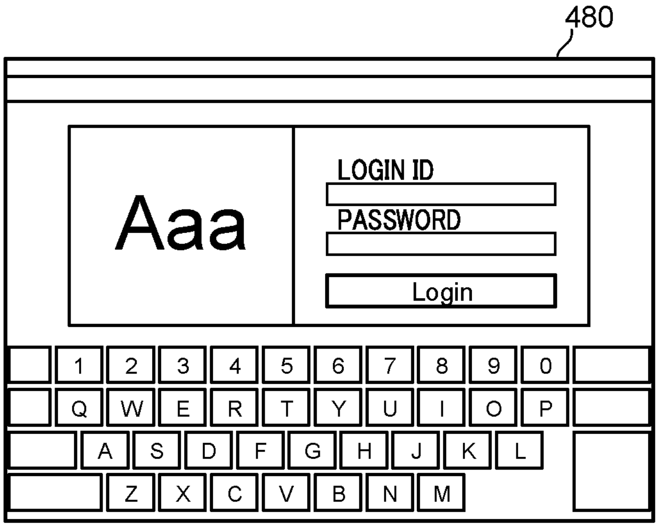
FIG. 17B illustrates an exemplary login screen for the administrator displayed on the rear display.

FIG. 17B illustrates an exemplary login screen 480 for the administrator displayed on the rear display RD. When the administrator successfully logs in, the menu screen 450 and error cancellation screen 460 illustrated in FIG. 16 are displayed in place of the login screen 480.

On the login screen 480, fields for entering the login ID and password for the administrator to log in and a virtual keyboard are displayed In order to display such a login screen 480 on the rear display RD, the control unit 12 of the medium handling apparatus 100 transmits, for example, a URL "https://localhost/ccc/?xyz=rear" to the server device 200.

Herein, "https://localhost/ccc/" is the URL of the login screen 480, and xyz is a parameter indicating the display destination of the login screen 480. In this case, xyz is set to rear, that is, to the rear display RD.

On the other hand, for the front display FD, the control unit 12 of the medium handling apparatus 100 transmits, for example, a URL "https://localhost/ccc/ddd/?xyz=front" to the server device 200.

Herein, "https://localhost/ccc/ddd/" is the URL of the display screen that cannot be operated by the administrator. In addition, xyz is set to front, that is, to the front display FD.

The control unit 12 of the medium handling apparatus 100 receives an HTML document configuring a WEB page corresponding to the above URL from the server device 200. The control unit 12 then displays the login screen 470, which can be operated by the administrator, on the rear display RD and displays the display screen, which cannot be operated by the administrator, on the front display FD in the medium handling apparatus 100.

Furthermore, regarding the operation of the menu screen 450, the given authority may vary according to an administrator. For example, the server device 200 stores in advance information on the authority granted to each administrator in the storage unit of the server device 200.

The server device 200 then reads authority information of the logged-in administrator from the storage unit, generates an HTML document that defines the configuration of a menu screen allowing an operation that varies depending on the administrator, and transmits the HTML document to the medium handling apparatus 100.

The control unit 12 of the medium handling apparatus 100 having received the HTML document generates a menu screen based on the received HTML document, and causes the display to display the generated menu screen.

The menu screen 450 illustrated in FIG. 16 is displayed for an administrator who has been granted all of the authority. On the other hand, a menu screen 490 illustrated in FIG. 18 is displayed for an administrator who has been granted part of the authority.

Figure 18:
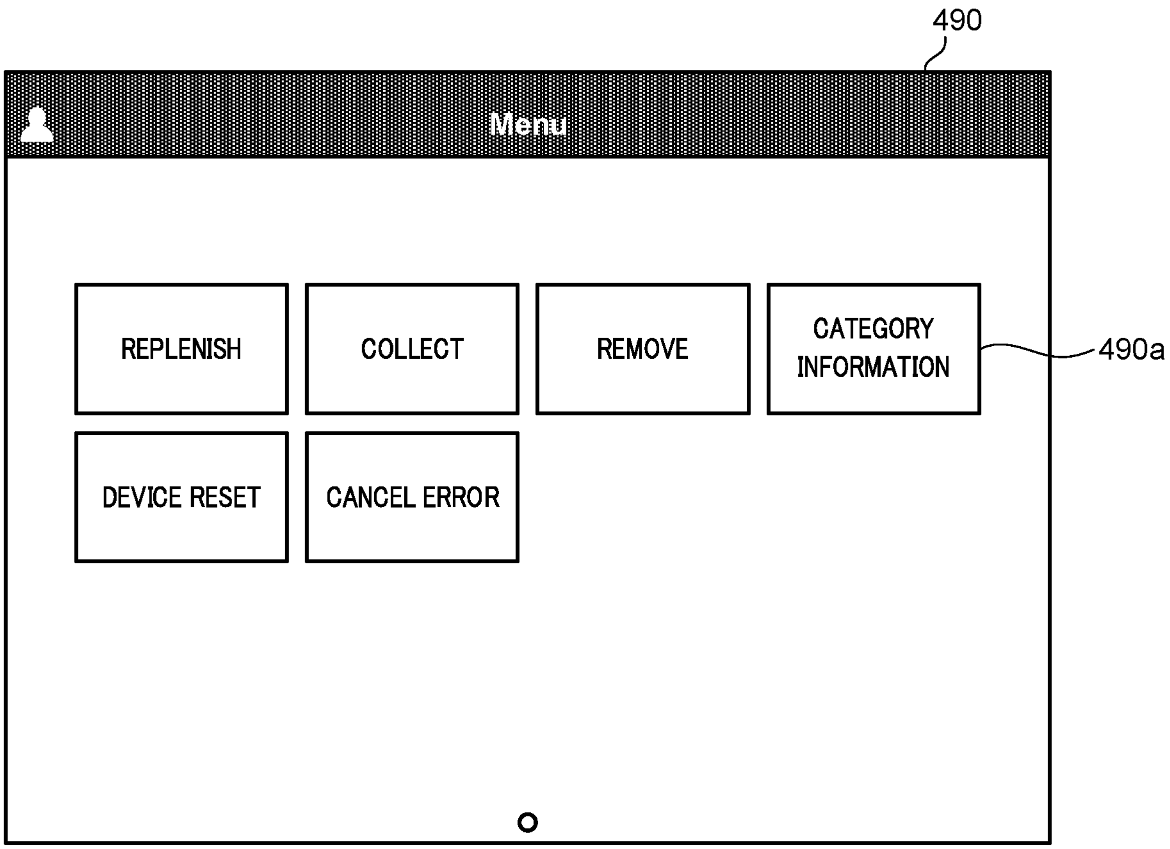
FIG. 18 illustrates an exemplary menu screen displayed for an administrator who is granted part of the authority.

FIG. 18 illustrates the exemplary menu screen 490 displayed for the administrator who has been granted part of the authority. The menu screen 490 illustrated in FIG. 18 shows a reduced number of items that can be selected by the administrator compared to the menu screen 450 illustrated in FIG. 16. In this manner, the authority of the administrator is restricted by changing the display screen.

In addition, the operation that an administrator can perform on the medium handling apparatus 100 may change between when the administrator logs in by using the login screen 470 displayed on the front display FD and when the administrator logs in by using the login screen 480 displayed on the rear display RD.

For example, the server device 200 transmits, to the medium handling apparatus 100, HTML documents configuring operation screens different to each other between when login is performed by using the login screen 470 and when login is performed by using the login screen 480. The control unit 12 of the medium handling apparatus 100 then generates an operation screen based on the received HTML document, and causes the display to display the operation screen.

Figure 19A:
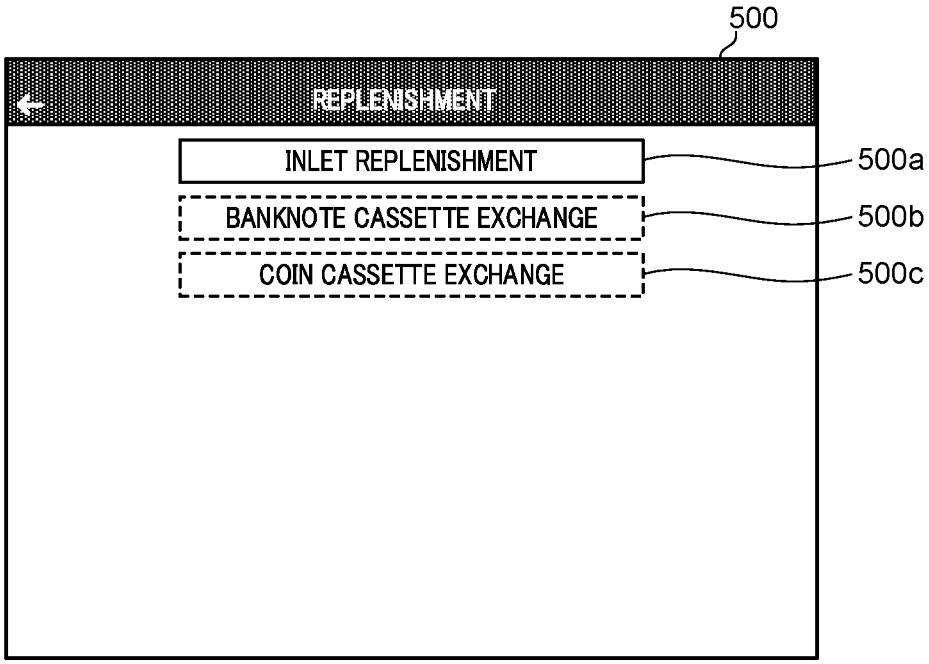
FIG. 19A illustrates an exemplary replenishment screen of valuable media that is displayed when login is performed by using the login screen displayed on the front display.
Figure 19B:
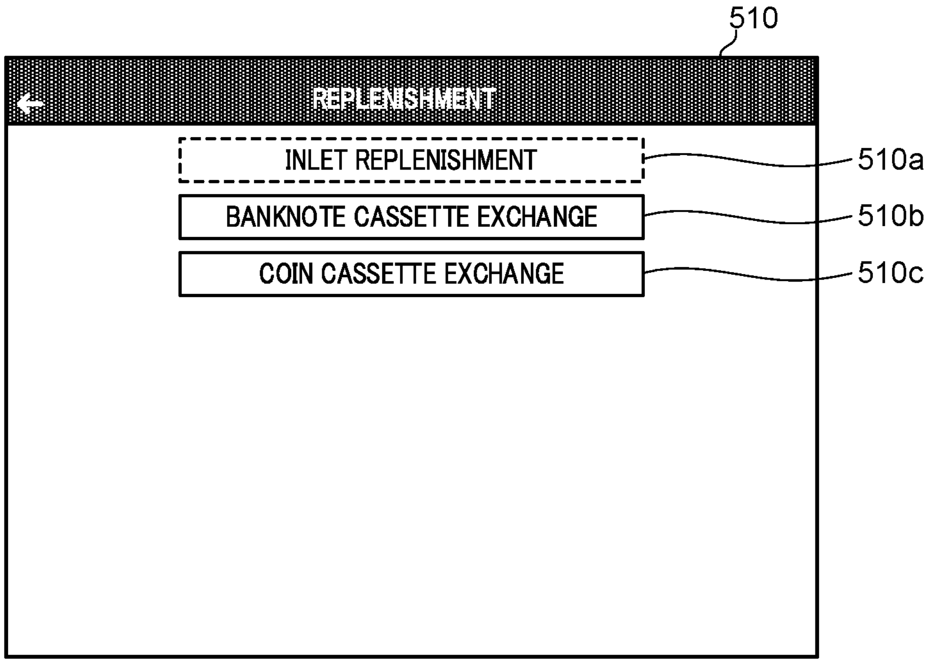
FIG. 19B illustrates an exemplary replenishment screen of valuable media that is displayed when login is performed by using the login screen displayed on the rear display.

FIG. 19A illustrates an exemplary replenishment screen 500 of valuable media that is displayed when login is performed by using the login screen 470 displayed on the front display FD. FIG. 19B illustrates an exemplary replenishment screen 510 of valuable media that is displayed when login is performed by using the login screen 480 displayed on the rear display RD. Herein, each of the replenishment screens 500 and 510 is one of the operation screens that accept operations by an administrator.

The replenishment screen 500 illustrated in FIG. 19A displays an inlet replenishment button 500*a*, a banknote cassette exchange button 500*b*, and a coin cassette exchange button 500*c*.

The inlet replenishment button 500*a* is a button that is pressed for replenishing banknotes or coins from the inlet of the banknote device 3 or of the loose money device 4.

The banknote cassette exchange button 500*b* is a button that is pressed for exchanging banknote cassettes to replenish the banknote device 3 with banknotes.

The coin cassette exchange button 500*c* is a button that is pressed for exchanging money cassettes to replenish the loose money device 4 with money.

On replenishment screen 500 displayed on the front display FD, an administrator can only press the inlet replenishment button 500*a*, but cannot press the banknote cassette exchange button 500*b* and coin cassette exchange button 500*c*. In this manner, it s possible to prohibit the administrator from exchanging banknote cassettes and money cassettes.

Also displayed on the replenishment screen 510 (illustrated in FIG. 19B) displayed on the rear display RD are an inlet replenishment button 510*a*, a banknote cassette exchange button 510*b*, and a coin cassette exchange button 510*c*.

The inlet replenishment button 510*a*, the banknote cassette exchange button 510*b*, and the coin cassette exchange button 510*c* are buttons that have the same roles as the inlet replenishment button 500*a*, the banknote cassette exchange button 500*b*, and coin cassette exchange button 500*c*, respectively.

On replenishment screen 510 displayed on the rear display RD, an administrator cannot press the inlet replenishment button 510*a*, but can only press the banknote cassette exchange button 510*b* and coin cassette exchange button 510*c*. In this manner, it is possible to prohibit the administrator from replenishing banknotes or coins from the inlet.

As described above, a medium handling apparatus 100 is a medium handling apparatus that performs a transaction of a valuable medium. The medium handling apparatus 100 comprises the following: at least one display such as a front display FD and a rear display RD; a communication unit 10 that receives, from a server device 200, transaction screen configuration data defining the configuration of a transaction screen to be displayed on the display; a storage unit 11 that stores data of an image to be embedded in the transaction screen; and a control unit 12 that generates, based on the transaction screen configuration data and the data of the image, the transaction screen in which the image is embedded, and causes the display to display the transaction screen.

In this manner, even when the medium handling apparatus 100 is changed, system development can be performed efficiently.

In addition, the display comprises a plurality of displays, such as a front display FD and a rear display RD. When the control unit 12 receives, from the server device 200, operation screen configuration data that defines the configuration of an operation screen and comprises an instruction to display the operation screen on one display of the plurality of displays, the control unit 12 displays the operation screen on the one display according to the instruction.

In this manner, the operation screen can be displayed on the display that is easy for an administrator of the medium handling apparatus 100 to operate.

In addition, the operation screen configuration data is data that defines the configuration of an operation screen allowing an operation that varies depending on a display on which the operation screen is displayed.

In this manner, an appropriate operation screen can be displayed depending on the position where the display is installed, for example, as follows: on the operation screen of the front display FD, a button related to work to be performed at the rear of the medium handling apparatus 100 cannot be pressed; and on the operation screen of the rear display RD, a button related to work to be performed at the front of the medium handling apparatus 100 cannot be pressed.

In addition, the operation screen configuration data is data that defines the configuration of an operation screen allowing an operation that varies depending on an operator.

In this manner, regarding various operations performed by administrators on the medium handling apparatus 100, authority that varies according to each administrator of the medium handling apparatus 100 can be given.

In addition, the storage unit 11 further stores error cancellation screen configuration data and data of an error cancellation image, the error cancellation screen configuration data defining the configuration of an error cancellation screen that prompts for error cancellation when an error occurs. When the error occurs, the control unit 12 generates the error cancellation screen based on the error cancellation screen configuration data and the error cancellation image data, and causes the error cancellation screen to be displayed in the foreground so as to be superposed on other displayed screens.

In this manner, an error cancellation screen suitable for each medium handling apparatus 100 can be displayed in a state that is easy for an administrator to operate.

In addition, the image to be embedded in the transaction screen has a size identical with the size of the display area of the image defined in the transaction screen configuration data.

In this manner, it is possible to prevent the displayed image from becoming rough or difficult to see.

In addition, the image to be embedded in the transaction screen comprises a plurality of images that are sequentially embedded in the transaction screen according to the progress of the transaction. The control unit 12 generates a transaction screen in which each image is embedded according to the progress of the transaction, and causes the display to display the transaction screen.

In this manner, even when the medium handling apparatus 100 is a device that displays a transaction screen comprising, for example, a guiding image that guides a user according to the progress of the transaction, the system can be efficiently developed.

In addition, the communication unit 10 further receives a request to execute the transaction from the server device 200, and the control unit 12 executes the transaction according to the request received from the server device 200.

In this manner, a kiosk App 150 that displays a transaction screen and a control App 160 that controls the execution of the transaction do not directly communicate to each other, but the kiosk App 150 receives a request to display the transaction screen from a web App 200*a*, and the control App 160 receives the request to execute the transaction from the web App 200*a*. Therefore, software on the medium handling apparatus 100 side can be easily developed.

In addition, the image to be embedded in the transaction screen is a guiding image that guides the operator.

In this manner, even when the medium handling apparatus 100, which displays a transaction screen with the guiding image embedded therein, is changed, system development can be performed efficiently.

In addition, the transaction screen configuration data is written in HTML.

In this manner, the transaction screen configuration data can be easily created.

In addition, the image is embedded in the transaction screen by using an iframe tag.

Images thus can be easily embedded in transaction screens.

In addition, a medium handling system according to the present disclosure comprises a medium handling apparatus 100 and a server device 200 that transmits configuration data to the medium handling apparatus 100.

In this manner, the present disclosure can easily provide a medium handling system that allows efficient system development even when the medium handling apparatus 100 is changed.

The present disclosure is not limited to the above embodiments, and various changes can be made without departing from the gist of the present disclosure. In particular, the plurality of embodiments and variations described in the present specification can be combined as necessary.

The invention claimed is:

1. A medium handling apparatus that performs various transactions of a valuable medium, the medium handling apparatus comprising a plurality of devices corresponding to the various transactions, and further comprising:
- a display;
- a communicator that receives, from a server device, transaction screen configuration data defining a configuration of a transaction screen to be displayed on the display;
- a storage that stores data of a plurality of images to be embedded in the transaction screen, the plurality of images corresponding respectively to the plurality of devices; and
  - a controller configured to:
  - generate the transaction screen based on the transaction screen configuration data;
  - receive a notification of an event occurring in a specific device among the plurality of devices according to progress of a transaction;
  - select a specific image corresponding to the specific device among the plurality of images stored in the storage;
  - embed the specific image in the transaction screen; and
  - cause the display to display the transaction screen.

2. The medium handling apparatus according to claim 1, wherein:
- the display comprises a plurality of displays; and
- when the controller receives, from the server device, operation screen configuration data that defines a configuration of an operation screen and that comprises an instruction to display the operation screen on one display of the plurality of displays, the controller displays the operation screen on the one display of the plurality of displays according to the instruction.

3. The medium handling apparatus according to claim 2, wherein the operation screen configuration data is data that defines the configuration of the operation screen, the operation screen allowing an operation that varies depending on a display on which the operation screen is displayed, the display being one of the plurality of displays.

4. The medium handling apparatus according to claim 2, wherein the operation screen configuration data is data that defines the configuration of the operation screen, the operation screen allowing an operation that varies depending on an operator.

5. The medium handling apparatus according to claim 1, wherein:

the storage further stores error cancellation screen configuration data and data of an error cancellation image, the error cancellation screen configuration data defining a configuration of an error cancellation screen that prompts for error cancellation when an error occurs; and when the error occurs, the controller generates the error cancellation screen based on the error cancellation screen configuration data and the data of the error cancellation image, and causes the error cancellation screen to be displayed in a foreground so as to be superposed on another displayed screen.

6. The medium handling apparatus according to claim 1, wherein the specific image to be embedded in the transaction screen has a size identical with a size of a display area of the specific image defined in the transaction screen configuration data.

7. The medium handling apparatus according to claim 1, wherein:

the specific image to be embedded in the transaction screen comprises a plurality of images that are sequentially embedded in the transaction screen according to progress of the transaction; and the controller generates the transaction screen in which each of the plurality of images is embedded according to the progress of the transaction, and causes the display to display the transaction screen.

8. The medium handling apparatus according to claim 1, wherein the communicator further receives a request to execute the transaction from the server device, and the controller executes the transaction according to the request received from the server device.

9. The medium handling apparatus according to claim 1, wherein the specific image to be embedded in the transaction screen is a guiding image that guides an operator.

10. The medium handling apparatus according to claim 1, wherein the transaction screen configuration data is written in HTML.

11. The medium handling apparatus according to claim 10, wherein the specific image is embedded in the transaction screen by using an iframe tag.

12. A medium handling system comprising:

the medium handling apparatus according to claim 1; and the server device transmitting the transaction screen configuration data to the medium handling apparatus.

13. A medium handling method performed by a medium handling apparatus that performs various transactions of a valuable medium, the medium handling apparatus comprising a plurality of devices corresponding to the various transactions, the medium handling method comprising:

receiving, from a server device, transaction screen configuration data defining a configuration of a transaction screen to be displayed on a display;

generating, the transaction screen based on the transaction screen configuration data;

receiving a notification of an event occurring in a specific device among the plurality of devices according to progress of a transaction;

selecting a specific image corresponding to the specific device among a plurality of images stored in a storage of the medium handling apparatus;

embedding the specific image in the transaction screen; and causing the display to display the transaction screen.

14. A non-transitory recording medium recording thereon a medium handling program that performs various transactions of a valuable medium, the medium handling program causing a medium handling apparatus comprising a plurality of devices corresponding to the various transactions to execute:

receiving, from a server device, transaction screen configuration data defining a configuration of a transaction screen to be displayed on a display;

generating the transaction screen based on the transaction screen configuration data;

receiving a notification of an event occurring in a specific device among the plurality of devices according to progress of a transaction;

selecting a specific image corresponding to the specific device among a plurality of images stored in a storage of the medium handling apparatus;

embedding the specific image in the transaction screen; and causing the display to display the transaction screen.

* * * * *